United States Patent
Olmstead et al.

(10) Patent No.: US 12,214,311 B2
(45) Date of Patent: Feb. 4, 2025

(54) CAPTURING CARBON DIOXIDE

(71) Applicant: Carbon Engineering ULC, Squamish (CA)

(72) Inventors: Douglas Edward Olmstead, Squamish (CA); Megan Lynn O'Brien, Squamish (CA); Teresa Juliet Pena Bastidas, Squamish (CA); Todd Ernest Wilke, West Vancouver (CA)

(73) Assignee: Carbon Engineering ULC, Squamish (CA)

( * ) Notice: Subject to any disclaimer, the term of this patent is extended or adjusted under 35 U.S.C. 154(b) by 433 days.

(21) Appl. No.: 17/544,578

(22) Filed: Dec. 7, 2021

(65) Prior Publication Data
US 2022/0176312 A1    Jun. 9, 2022

Related U.S. Application Data

(60) Provisional application No. 63/122,398, filed on Dec. 7, 2020.

(51) Int. Cl.
*B01D 53/14* (2006.01)
*B01D 53/18* (2006.01)
(Continued)

(52) U.S. Cl.
CPC ........... *B01D 53/185* (2013.01); *B01D 53/14* (2013.01); *B01D 53/1475* (2013.01);
(Continued)

(58) Field of Classification Search
CPC .............................. B01D 53/14; B01D 53/185
See application file for complete search history.

(56) References Cited

U.S. PATENT DOCUMENTS

| 3,363,885 A | 1/1968 | Meek |
| 3,738,626 A | 6/1973 | Norback |

(Continued)

FOREIGN PATENT DOCUMENTS

| CN | 101936678 | 1/2011 |
| CN | 108201785 A * | 6/2018 |

(Continued)

OTHER PUBLICATIONS

International Preliminary Report on Patentability in International Appln. No. PCT/US2021/062247, mailed on Jun. 22, 2023, 14 pages.

(Continued)

*Primary Examiner* — Robert A Hopkins
(74) *Attorney, Agent, or Firm* — Fish & Richardson P.C.

(57) ABSTRACT

A system for removing $CO_2$ from a dilute gas mixture includes a frame including a plurality of structural members; at least one packing section including one or more packing sheets, the one or more packing sheets including a plurality of macrostructures; one or more basins positioned at least partially below the at least one packing section, the one or more basins configured to hold a $CO_2$ capture solution; at least one fan positioned to circulate a $CO_2$ laden gas through the at least one packing section; and a liquid distribution system configured to flow the $CO_2$ capture solution onto the at least one packing section.

26 Claims, 12 Drawing Sheets

(51) Int. Cl.
*B01D 53/62* (2006.01)
*B01D 53/78* (2006.01)
*B01J 19/32* (2006.01)
*C08J 5/18* (2006.01)
*C08J 7/056* (2020.01)
*C09D 175/14* (2006.01)

(52) U.S. Cl.
CPC .............. *B01D 53/62* (2013.01); *B01D 53/78* (2013.01); *B01J 19/32* (2013.01); *C08J 5/18* (2013.01); *C08J 7/056* (2020.01); *C09D 175/14* (2013.01); *B01D 2251/304* (2013.01); *B01D 2251/306* (2013.01); *B01D 2251/602* (2013.01); *B01D 2257/504* (2013.01); *B01D 2258/06* (2013.01); *C08J 2327/06* (2013.01); *C08J 2475/14* (2013.01)

(56) References Cited

U.S. PATENT DOCUMENTS

| | | | |
|---|---|---|---|
| 4,361,426 A | 11/1982 | Carter et al. | |
| 4,455,339 A | 6/1984 | Meier | |
| 4,781,869 A | 11/1988 | Wiltz | |
| 5,474,832 A | 12/1995 | Massey | |
| 5,653,126 A | 8/1997 | Harada et al. | |
| 6,119,481 A | 9/2000 | Sunder | |
| 6,206,350 B1 * | 3/2001 | Harrison | F28C 1/16 |
| | | | 261/DIG. 11 |
| 6,378,332 B1 | 4/2002 | Billingham et al. | |
| 9,095,813 B2 | 8/2015 | Keith et al. | |
| 10,953,382 B2 | 3/2021 | Nieuwoudt et al. | |
| 11,014,064 B2 | 5/2021 | Clifford et al. | |
| 11,369,940 B2 | 6/2022 | Headley | |
| 2001/0051119 A1 * | 12/2001 | Overbeek | B01J 19/32 |
| | | | 422/600 |
| 2003/0098515 A1 | 5/2003 | Smith et al. | |
| 2004/0060769 A1 | 4/2004 | Hentschel et al. | |
| 2006/0001182 A1 | 1/2006 | Kinney et al. | |
| 2016/0121297 A1 | 5/2016 | Wehrli | |
| 2019/0344217 A1 | 11/2019 | Heidel et al. | |

FOREIGN PATENT DOCUMENTS

| | | | |
|---|---|---|---|
| EP | 1004839 | | 5/2000 |
| GB | 1202704 | | 8/1970 |
| GB | 1318646 | | 5/1973 |
| GB | 1449872 | | 9/1976 |
| JP | H11218397 A | * | 8/1999 |
| JP | 2018134604 A | * | 8/2018 |
| WO | WO2019204320 | | 10/2019 |
| WO | WO2020068143 | | 4/2020 |
| WO | WO2020113064 | | 6/2020 |

OTHER PUBLICATIONS

International Search Report and Written Opinion in International Appln. No. PCT/US2021/062247, dated May 25, 2022, 22 pages.
Invitation to Pay Additional Fees in International Appln. No. PCT/US2021/062247, dated Apr. 4, 2022, 16 pages.
J. Thompson, K. Liu, University of Kentucky, Presentation: Advancing Post-Combustion CO2 Capture through Increased Mass Transfer and Lower Degradation, 2019.

* cited by examiner

CAPTURING CARBON DIOXIDE

CROSS-REFERENCE TO RELATED APPLICATION

This application claims priority under 35 U.S.C. § 119 to U.S. Provisional Patent Application Ser. No. 63/122,398, filed on Dec. 7, 2020, the entire contents of which are incorporated by reference herein.

TECHNICAL FIELD

This disclosure describes systems, apparatus, and methods for capturing carbon dioxide.

BACKGROUND

Capturing carbon dioxide ($CO_2$) from the atmosphere is one approach to mitigating greenhouse gas emissions and slowing climate change. However, many technologies designed for $CO_2$ capture from point sources, such as flue gas of industrial facilities, are generally ineffective in capturing $CO_2$ from the atmosphere due to the significantly lower $CO_2$ concentrations and large volumes of air required to process. In recent years, progress has been made in finding technologies better suited to capture $CO_2$ directly from the atmosphere. Some of these direct air capture (DAC) systems use a solid sorbent where an active agent is attached to a substrate. These DAC systems typically employ a cyclic adsorption-desorption process where, after the solid sorbent is saturated with $CO_2$, it releases the $CO_2$ using a humidity or thermal swing and is regenerated. While solid sorbent DAC systems can have a high cyclic yield, large scale deployment is a challenge due to maintenance requirements that are inherent to a batch process.

Other DAC systems use a liquid sorbent (sometimes referred to as a solvent) to capture $CO_2$ from the atmosphere. An example of such a gas-liquid contact system would be one that is based on cooling tower designs where a fan is used to draw air across a high surface area packing that is wetted with a solution comprising the liquid sorbent. $CO_2$ in the air reacts with the liquid sorbent. The rich solution is further processed downstream to regenerate a lean solution and to release a concentrated $CO_2$ stream. DAC systems that are designed based on cooling towers are advantageous in part because they employ some commercially available equipment, as well as existing supply chains and related infrastructure, and they can operate more effectively in certain environments than others. It is desirable for DAC systems to be simply maintainable and operationally flexible.

SUMMARY

In an example implementation, a system for removing $CO_2$ from a dilute gas mixture includes a frame including a plurality of structural members; at least one packing section including one or more packing sheets, the one or more packing sheets including a plurality of macrostructures; one or more basins positioned at least partially below the at least one packing section, the one or more basins configured to hold a $CO_2$ capture solution; at least one fan positioned to circulate a $CO_2$ laden gas through the at least one packing section; and a liquid distribution system configured to flow the $CO_2$ capture solution onto the at least one packing section.

In an aspect combinable with the example implementation, the at least one packing section and fan are configured to flow the $CO_2$-laden gas through the at least one packing section in a crossflow configuration relative to the $CO_2$ capture solution.

In another aspect combinable with any of the previous aspects, the at least one packing section and fan are configured to flow the $CO_2$-laden gas through the at least one packing section in a counterflow configuration relative to the $CO_2$ capture.

In another aspect combinable with any of the previous aspects, the $CO_2$ capture solution includes KOH.

In another aspect combinable with any of the previous aspects, the liquid distribution system includes one or more top basins positioned at or near a top of the frame; one or more redistribution systems positioned below the one or more top basins and within the at least one packing sections; and one or more bottom basins positioned at or near a bottom of the frame.

In another aspect combinable with any of the previous aspects, the one or more packing sheets include a first set of gradual channels at a first angle and a second set of gradual channels at a second angle that is greater than the first angle.

In another aspect combinable with any of the previous aspects, the first angle is 15 degrees and the second angle is 45 degrees or less.

In another aspect combinable with any of the previous aspects, the flow of the $CO_2$ capture solution from at least one of the one or more basins on the at least one packing section includes a film flow regime.

In another aspect combinable with any of the previous aspects, the one or more packing sheets includes a hydrophilic surface coating.

In another aspect combinable with any of the previous aspects, the hydrophilic surface coating includes a cellulose coating.

In another aspect combinable with any of the previous aspects, the cellulose coating includes an ethylene vinyl acetate (EVA) layer and a cellulose layer.

In another aspect combinable with any of the previous aspects, the cellulose coating is applied to one or more layers of hydrophilic packing material with a calendering process.

In another aspect combinable with any of the previous aspects, the hydrophilic surface coating is applied to both sides of each of the one or more layers of hydrophilic packing material.

In another aspect combinable with any of the previous aspects, the hydrophilic surface coating includes an acrylic coating.

In another aspect combinable with any of the previous aspects, the acrylic coating includes at least one of a urethane-acrylic hybrid copolymer or a self-crosslinking acrylic copolymer emulsion.

In another aspect combinable with any of the previous aspects, the acrylic coating includes a plurality of acrylic layers.

In another aspect combinable with any of the previous aspects, the plurality of acrylic layers includes a first acrylic layer of the urethane-acrylic hybrid copolymer or the self-crosslinking acrylic copolymer emulsion; and a second acrylic layer of the urethane-acrylic hybrid copolymer blended with the self-crosslinking acrylic copolymer emulsion.

In another aspect combinable with any of the previous aspects, the hydrophilic surface coating includes a fouling layer.

In another aspect combinable with any of the previous aspects, the one or more packing sheets includes a hydrophilic surface treatment.

In another aspect combinable with any of the previous aspects, the hydrophilic surface treatment includes at least one of: a plasma treatment, a flame treatment, a corona treatment, or a chemical treatment.

In another aspect combinable with any of the previous aspects, the plurality of macrostructures includes at least one of: corrugations, flutes, herringbone, or channels.

In another aspect combinable with any of the previous aspects, the one or more packing sheets further includes a plurality of microstructures.

In another aspect combinable with any of the previous aspects, the plurality of microstructures includes a plurality of ridges that are nonparallel to the corrugations.

In another aspect combinable with any of the previous aspects, the corrugations are aligned with a direction of the flow of the $CO_2$ capture solution from the one or more basins onto the at least one packing section.

In another aspect combinable with any of the previous aspects, the plurality of microstructures includes at least one of ridges, dimples, pores, etches, granules, fibres, perforations, or a combination thereof.

In another aspect combinable with any of the previous aspects, the ridges include a plurality of cross-stream ridges.

In another aspect combinable with any of the previous aspects, the one or more packing sheets includes at least one hydrophilic coating covering at least a portion of the one or more packing sheets.

In another aspect combinable with any of the previous aspects, the at least one hydrophilic coating includes a cellulose layer and at least one of an EVA layer or a PVC glue layer.

In another aspect combinable with any of the previous aspects, the at least one hydrophilic coating includes at least one acrylic coating.

In another aspect combinable with any of the previous aspects, the at least one acrylic coating includes at least one of a urethane-acrylic hybrid copolymer or a self-crosslinking acrylic copolymer emulsion.

In another aspect combinable with any of the previous aspects, the at least one acrylic coating includes a first acrylic layer that includes the urethane-acrylic hybrid copolymer or the self-crosslinking acrylic copolymer emulsion; and a second acrylic layer that includes the urethane-acrylic hybrid copolymer blended with the self-crosslinking acrylic copolymer emulsion.

In another aspect combinable with any of the previous aspects, the urethane-acrylic hybrid copolymer blends with the self-crosslinking acrylic copolymer emulsion at one of the following ratios: 20/80, 80/20, or 50/50.

In another aspect combinable with any of the previous aspects, the at least one hydrophilic coating includes a fouling layer.

In another aspect combinable with any of the previous aspects, the one or more packing sheets includes a hydrophilic material composition.

In another aspect combinable with any of the previous aspects, the hydrophilic material composition includes a PVC resin or vinyl compound.

In another aspect combinable with any of the previous aspects, the hydrophilic material composition is formed into the one or more layers of hydrophilic packing material with a mold and vacuum forming process.

In another aspect combinable with any of the previous aspects, the $CO_2$ capture solution includes a low surface tension $CO_2$ capture solution.

In another aspect combinable with any of the previous aspects, the low surface tension $CO_2$ capture solution includes an atomized $CO_2$ capture solution that is sprayed on the at least one packing section.

In another aspect combinable with any of the previous aspects, the low surface tension $CO_2$ capture solution includes a rate-enhancing additive.

In another aspect combinable with any of the previous aspects, the rate-enhancing additive includes at least one of carbonic anhydrase, piperazine, MEA, DEA, zinc triazacycles, zinc tetraazacycles, copper glycinates, hydroxopentaaminecobalt perchlorate, formaldehyde hydrate, saccharose, fructose, glucose, phenols, phenolates, glycerin, arsenite, hypochlorite, hypobromite, or other oxyanionic species.

In another aspect combinable with any of the previous aspects, the rate-enhancing additive is immobilized in one or more capsules within the $CO_2$ capture solution.

In another aspect combinable with any of the previous aspects, the one or more packing sheets includes a rate-enhancing additive.

In another aspect combinable with any of the previous aspects, the rate-enhancing additive includes at least one of carbonic anhydrase, piperazine, MEA, DEA, zinc triazacycles, zinc tetraazacycles, copper glycinates, hydroxopentaaminecobalt perchlorate, formaldehyde hydrate, saccharose, fructose, glucose, phenols, phenolates, glycerin, arsenite, hypochlorite, hypobromite, or other oxyanionic species.

In another aspect combinable with any of the previous aspects, the one or more packing sheets includes a rate-enhancing coating including a rate-enhancing additive.

In another aspect combinable with any of the previous aspects, the one or more packing sheets includes a plurality of dissolvable solids.

In another aspect combinable with any of the previous aspects, the plurality of dissolvable solids include at least one of: calcium carbonate ($CaCO_3$) or potassium carbonate ($K_2CO_3$).

In another aspect combinable with any of the previous aspects, the $CO_2$ capture solution includes a caustic capture solution.

In another example implementation, a method of operating a system for capturing carbon dioxide ($CO_2$) includes flowing a dilute gas mixture including $CO_2$ into one or more packing sections of a gas-liquid contactor; flowing a capture solution over the one or more packing sections of the gas-liquid contactor, the one or more packing sections including at least one packing sheet, the at least one packing sheet including a plurality of macrostructures; reacting the dilute gas mixture with the capture solution to produce a $CO_2$ lean-gas; and operating a fan to discharge the $CO_2$-lean gas from the gas-liquid contactor.

In an aspect combinable with the example implementation, the at least one packing sheet includes a hydrophilic coating that covers at least a portion of the at least one packing sheet.

In another aspect combinable with any of the previous aspects, the hydrophilic coating includes at least one acrylic coating.

In another aspect combinable with any of the previous aspects, the at least one acrylic coating includes at least one of: a urethane-acrylic hybrid copolymer or a self-crosslinking acrylic copolymer emulsion.

In another aspect combinable with any of the previous aspects, the at least one acrylic coating includes a first acrylic layer that includes the urethane-acrylic hybrid copolymer or the self-crosslinking acrylic copolymer emulsion; and a second acrylic layer that includes the urethane-acrylic hybrid copolymer blended with the self-crosslinking acrylic copolymer emulsion.

In another aspect combinable with any of the previous aspects, the urethane-acrylic hybrid copolymer blends with the self-crosslinking acrylic copolymer emulsion at one of the following ratios: 20/80, 80/20, or 50/50.

In another aspect combinable with any of the previous aspects, the hydrophilic coating includes a cellulose layer and a bonding layer including at least one of EVA or PVC glue.

In another aspect combinable with any of the previous aspects, the hydrophilic coating includes a fouling layer.

In another aspect combinable with any of the previous aspects, the plurality of macrostructures includes at least one of: corrugations, flutes, herringbone, or channels.

In another aspect combinable with any of the previous aspects, the at least one packing sheet includes a plurality of microstructures.

In another aspect combinable with any of the previous aspects, the plurality of microstructures include at least one of: perforations, ridges, dimples, pores, etches, granules, or fibers.

In another aspect combinable with any of the previous aspects, the ridges include a plurality of cross-stream ridges.

In another aspect combinable with any of the previous aspects, flowing the dilute gas mixture including $CO_2$ into one or more packing sections of the gas-liquid contactor includes drawing the dilute gas mixture into an intake plenum positioned below the one or more packing sections.

In another aspect combinable with any of the previous aspects, flowing the dilute gas mixture including $CO_2$ into one or more packing sections of the gas-liquid contactor includes circulating the dilute gas mixture through the one or more packing sections in an average gas flow direction that is parallel to an average liquid flow direction of the capture solution.

In another aspect combinable with any of the previous aspects, flowing the capture solution over the one or more packing sections of the gas-liquid contactor includes flowing the capture solution at a liquid loading rate ranging from 0 $L/m^2s$ to 10 $L/m^2s$.

In another aspect combinable with any of the previous aspects, the at least one packing sheet includes a plurality of dissolvable solids.

In another aspect combinable with any of the previous aspects, the plurality of dissolvable solids include at least one of calcium carbonate ($CaCO_3$) or potassium carbonate ($K_2CO_3$).

In another aspect combinable with any of the previous aspects, the capture solution includes a caustic solution.

In another example implementation, an apparatus for distributing a $CO_2$ capture solution includes a packing section including a plurality of packing sheets positioned to contact a $CO_2$ capture solution and a $CO_2$-laden gas; and a distance from a first end of the packing section to a second end of the packing section is between 2 meters to 10 meters.

In an aspect combinable with the example implementation, the liquid loading rate ranges from 0 $L/m^2s$ to 10 $L/m^2s$.

In another aspect combinable with any of the previous aspects, the $CO_2$ capture solution includes a caustic capture solution.

In another aspect combinable with any of the previous aspects, at least one packing sheet of the plurality of packing sheets includes a plurality of macrostructures.

In another aspect combinable with any of the previous aspects, the plurality of macrostructures include at least one of: corrugations, flutes, herringbone, or channels.

In another aspect combinable with any of the previous aspects, at least one of the corrugations has a width of 0.5 inches to 4 inches.

In another aspect combinable with any of the previous aspects, each packing sheet of the plurality of packing sheets is positioned at least 0.2 inches apart from another packing sheet of the plurality of packing sheets.

In another aspect combinable with any of the previous aspects, at least one packing sheet of the plurality of packing sheets includes a plurality of microstructures.

In another aspect combinable with any of the previous aspects, each microstructure of the plurality of microstructures is less than 10 mm in width.

In another aspect combinable with any of the previous aspects, each microstructure of the plurality of microstructures is shaped in at least one of: ridges, dimples, pores, etches, granules, fibers, or perforations.

In another aspect combinable with any of the previous aspects, each of the ridges has a length that is oriented at a nonparallel angle relative to a flow direction of the $CO_2$ capture solution.

In another aspect combinable with any of the previous aspects, the nonparallel angle includes a perpendicular angle.

In another aspect combinable with any of the previous aspects, at least one packing sheet of the plurality of packing sheets includes at least one hydrophilic coating that covers at least a portion of the at least one packing sheet.

In another aspect combinable with any of the previous aspects, a first hydrophilic coating of the at least one hydrophilic coating includes a cellulose layer, and at least one of an EVA layer or a PVC glue layer.

In another aspect combinable with any of the previous aspects, the cellulose layer includes a cellulose layer thickness between 50 μm and 100 μm.

In another aspect combinable with any of the previous aspects, the EVA layer includes an EVA layer thickness of at least 30 μm.

In another aspect combinable with any of the previous aspects, the at least one hydrophilic coating includes at least one acrylic coating.

In another aspect combinable with any of the previous aspects, the at least one acrylic coating includes at least one of a urethane-acrylic hybrid copolymer or a self-crosslinking acrylic copolymer emulsion.

In another aspect combinable with any of the previous aspects, the at least one acrylic coating includes a first acrylic layer that includes the urethane-acrylic hybrid copolymer or the self-crosslinking acrylic copolymer emulsion; and a second acrylic layer that includes the urethane-acrylic hybrid copolymer blended with the self-crosslinking acrylic copolymer emulsion.

In another aspect combinable with any of the previous aspects, the urethane-acrylic hybrid copolymer coats the self-crosslinking acrylic copolymer emulsion.

In another aspect combinable with any of the previous aspects, the urethane-acrylic hybrid copolymer blends with the self-crosslinking acrylic copolymer emulsion at one of the following ratios: 20/80, 80/20, or 50/50.

In another aspect combinable with any of the previous aspects, the at least one hydrophilic coating includes a fouling layer.

In another aspect combinable with any of the previous aspects, the plurality of packing sheets includes a plurality of dissolvable solids.

In another aspect combinable with any of the previous aspects, the plurality of dissolvable solids include at least one of: calcium carbonate ($CaCO_3$) or potassium carbonate ($K_2CO_3$).

In another example implementation, a method of manufacturing a packing section includes providing a packing material feedstock that includes a packing material; and shaping the packing material to form a plurality of macrostructures.

An aspect combinable with the example implementation further includes applying a hydrophilic coating to the packing material.

In another aspect combinable with any of the previous aspects, applying the hydrophilic coating includes applying at least one acrylic coating.

In another aspect combinable with any of the previous aspects, the at least one acrylic coating includes at least one of: a urethane-acrylic hybrid copolymer or a self-crosslinking acrylic copolymer emulsion.

In another aspect combinable with any of the previous aspects, applying at least one acrylic coating includes applying a first acrylic layer of the urethane-acrylic hybrid copolymer or the self-crosslinking acrylic copolymer emulsion; and applying a second acrylic layer of the urethane-acrylic hybrid copolymer blended with the self-crosslinking acrylic copolymer emulsion.

In another aspect combinable with any of the previous aspects, applying the hydrophilic coating includes heating a bonding layer to a bonding temperature; applying the bonding layer to the packing material; placing a cellulose layer over the bonding layer and the packing material; and pressing the cellulose layer to the bonding layer using a hot roller.

In another aspect combinable with any of the previous aspects, the bonding layer includes ethylene vinyl acetate (EVA) and a bonding layer thickness of at least 30 um.

In another aspect combinable with any of the previous aspects, the bonding layer includes a PVC glue.

In another aspect combinable with any of the previous aspects, the cellulose layer includes a cellulose layer thickness of 50 um to 100 um.

In another aspect combinable with any of the previous aspects, the packing material includes a plastic substrate.

In another aspect combinable with any of the previous aspects, the plastic substrate includes PVC.

In another aspect combinable with any of the previous aspects, shaping the packing material includes shaping the plastic substrate using a set of calender rollers.

Another aspect combinable with any of the previous aspects further includes forming a plurality of microstructures on the packing material.

In another aspect combinable with any of the previous aspects, forming the plurality of microstructures on the packing material includes forming at least one of: ridges, dimples, pores, etches, granules, fibres, or perforations.

In another aspect combinable with any of the previous aspects, each microstructure of the plurality of microstructures are less than 10 mm in width.

In another aspect combinable with any of the previous aspects, forming the plurality of microstructures on the packing material includes introducing a plurality of dissolvable solids to the packing material; and removing at least a portion of the plurality of dissolvable solids with a dissolving fluid.

In another aspect combinable with any of the previous aspects, the plurality of dissolvable solids includes at least one of: calcium carbonate ($CaCO_3$) or potassium carbonate ($K_2CO_3$).

In another aspect combinable with any of the previous aspects, forming the plurality of microstructures on the packing material includes mechanically etching the packing material.

In another aspect combinable with any of the previous aspects, forming the plurality of microstructures on the packing material includes introducing a plurality of surface particles to the packing material, the surface particles including at least one of fibers or granules.

Another aspect combinable with any of the previous aspects further includes applying a surface treatment to the packing material, the surface treatment including at least one of: a plasma, flame, or corona treatment.

Another aspect combinable with any of the previous aspects further includes applying a rate-enhancing additive to the packing material.

In another aspect combinable with any of the previous aspects, shaping the packing material to form a plurality of macrostructures includes vacuum forming or thermoforming the packing material.

In another aspect combinable with any of the previous aspects, shaping the packing material to form a plurality of macrostructures includes forming at least one of: corrugations or channels.

Implementations of systems and methods for capturing carbon dioxide according to the present disclosure may include one, some, or all of the following features. For example, packing with the features described in this invention are designed specifically for commercial DAC applications and as such have the ability to reduce at least one of air volume, packing depth, liquid flow, and air contactor footprint without significant sacrifice to $CO_2$ uptake performance. Design criteria of DAC packing that reflect good performance include: low static pressure design, ability to distribute liquid evenly throughout fill height, low fouling capabilities, increase in air contacting efficiency, lower material requirements, efficiency effects of larger pack sizes, and manufacturability. Reducing the amount of fill volume required through the use of the features described in this invention also reduces the size and or number of commercial air contactors required for a given plant capture rate, and improving the reliability of the packing material under DAC operating conditions as mentioned herein should provide for longer life and reduction in maintenance costs.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
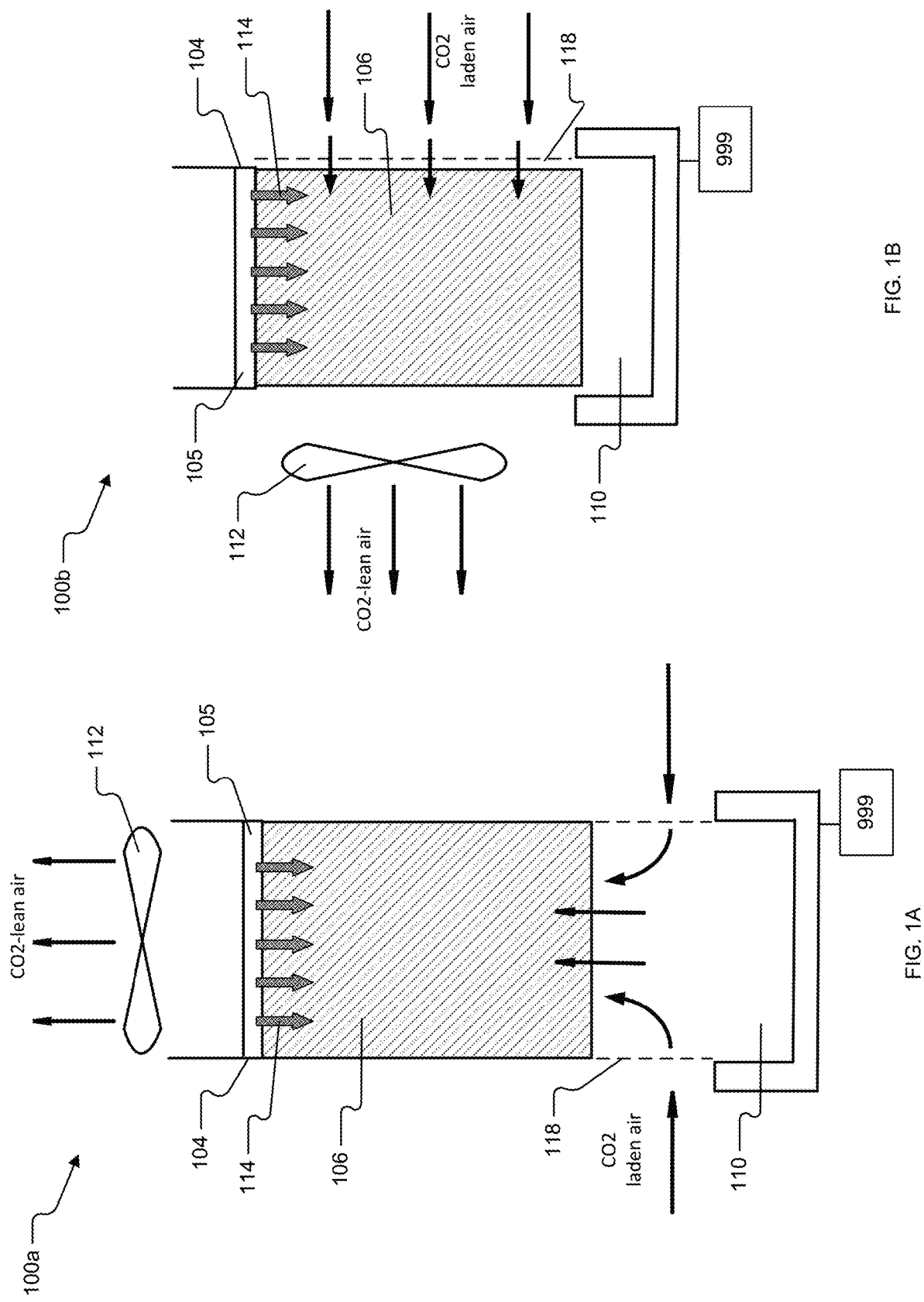
FIG. 1A and FIG. 1B show illustrative examples of interfaces between packing and other elements of gas-liquid contactors.

The present disclosure describes systems and method for capturing $CO_2$ from the atmosphere or other fluid source (such as air) that contains $CO_2$ with a gas-liquid contactor. In some aspects, the gas-liquid contactor includes a packing (also referred to herein as "fill") that comprises multiple sheets of packing material positioned to receive a flow of a liquid $CO_2$ sorbent and a flow of $CO_2$-laden airflow. Packing can comprise multiple packing sections, and each packing section can comprise one or more packing sheets. Packing sheets can be arranged to form a packing section that can be a three-dimensional structure of packing (e.g., block, column, cube, etc.). In some aspects, the packing is configured to exhibit hydrophilic properties (i.e., as a hydrophilic packing) rather than hydrophobic properties in order to maximize contact between the liquid $CO_2$ sorbent and a flow of $CO_2$-laden airflow across at least a portion of the packing.

The example implementation of the packing in the present disclosure, in preferred implementations, is designed for DAC applications, e.g., rather than conventional cooling tower applications or packed column applications. Such design considerations are numerous. For example, packing that is produced for packed columns or "packed towers," also known as "scrubbers" or "gas scrubbers" in chemical processing plants is designed for $CO_2$ concentrations of approximately 5-15% v/v. Thus, a significantly smaller volume of gas is needed for processing in chemical process packed towers in order to capture the equivalent amount of $CO_2$ from air using DAC. As such, the capture kinetics in a chemical processing facility are generally more favorable compared to absorption of dilute $CO_2$ concentrations as in a DAC system.

A chemical process counterflow packed column encounters certain problems, for example flooding. Flooding is a phenomenon by which gas moving in one direction in the packed column entrains liquid moving in the opposite direction in the packed column. Flooding is undesirable because it can cause a large pressure drop across the packed column as well as other effects that are detrimental to the performance and stability of the absorption process. The diameter to L/G velocity ratios in a chemical process counter-current flow absorber column are not the same as in a counter-current flow air contactor, hence the counter-current flow configuration in an air contactor does not run into the same issues as a chemical scrubbing tower. Therefore, while both CCS and DAC technologies capture $CO_2$ from a gas stream, the process designs for both technologies are different owing to their different feedstocks and process conditions.

There are also numerous design considerations as compared to conventional cooling towers. For example, commercially available packing from the cooling tower industry is designed for use with water and for maximizing heat transfer with less consideration for mass transfer, which is important for a DAC system. In cooling towers, the structural framework supports packing that is stacked or hung within the fill space of cooling tower cell. Commercially available packing can be formed from sheet metals (e.g., steel) or plastics such as PVC. Some structured packing formed from metal have excellent wetting properties, but metal packing is expensive and heavy. PVC is a commonly used material in cooling towers because it is light, moldable, affordable, and resistant to most chemicals.

Two types of structured packing are conventionally used in cooling towers: splash-type fill and film type fill. Splash-type fill consists of splash bars that are typically spaced evenly and are positioned horizontally. The splash bars break the flow of liquid, resulting in the liquid cascading through spaces between the splash bars and onto other splash bars, thereby creating droplets and wetted surfaces that react with gas. A major challenge of using splash-type fill is that the splash bars are prone to sagging which can disrupt gas flow, resulting in channeling and reduced performance. Splash bar systems also have a very low specific surface area. Splash-type fill used on its own for DAC applications would require significantly higher amounts of capture solution to enable equivalent mass transfer constraints and reaction kinetics.

Film-type fill is designed to promote spreading of liquid into a thin film on the surfaces of the fill. This enables maximum exposure of liquid to gas. Comparing splash-type fill to film-type fill, film-type fills are generally more compatible with DAC since they have the capacity for more effective mass transfer per unit volume of fill space. Film-type fill offers a much higher specific surface area-to-volume ratio ("specific surface area" in $m^2/m^3$) than splash-type fill. A high specific surface area is not only important for exposure of $CO_2$ to the surface of the capture solution, but it also has cost and structural implications. The lower the specific surface area, the more packing is required to absorb a large fraction of $CO_2$ from the air. More packing leads to an increase in the complexity and size of structural framework required to hold the packing.

The features that can be exploited to change the surface roughness of DAC packing can be different from that of cooling tower packing. Commercially available cooling tower packing that has surface roughness often leads to biological fouling issues in cooling towers. Biological fouling occurs because open-system conditions with water can create favorable environments for microbiological growth. In contrast, a DAC system that implements capture solutions that, for example, have a high pH or include caustic or carbonate solutions, do not share this concern and thus can employ a wider range of features compared to cooling tower packing.

In general, commercial cooling towers must move large volumes of air efficiently to remove process heat from the cooling water since the primary objective is heat transfer.

However, given that the goal of DAC is mass transfer of $CO_2$ rather than heat transfer, in combination with the dilute $CO_2$ concentrations (less than 1% v/v) in air that must be processed in DAC, large volumes of air must be processed by an air contactor of a DAC system in order to capture meaningful quantities of $CO_2$. Due to the DAC objective being mass transfer of dilute amounts of $CO_2$ from the air volume, rather than heat transfer, more packing is required for DAC applications than in a cooling tower, for a particular density of packing. The packing air travel depth (e.g., packing depth) in a gas-liquid contactor can be in the range of 2-10 meters for direct air capture, which is greater than the packing depth of a just a few feet that is typically used in cooling towers.

A gas-liquid contactor (such as an air contactor) of a DAC system is amenable to intermittent wetting by use of liquid flows that are substantially lower than that of a cooling tower. A few advantages of low liquid flows are that pumping equipment, infrastructure as well as pumping and fan power requirements are reduced. Packing that comes from the cooling tower industry is designed for substantially higher liquid loading rates than what is used in DAC. For example, cooling tower packing can be designed for liquid loading rates of approximately 4.1 $L/m^2s$. Cooling towers typically operate at full continuous flows for maximum heat transfer because they are usually coupled to a process wherein the process efficiency increases with lower cooling water supply temperatures. As a result, cooling towers do not have incentive to run at low liquid flows that risk reduction in heat transfer through uneven wetting of the packing. The liquid-to-gas ratio for DAC applications is about ten times less than that of cooling tower applications. For example, the liquid-to-gas ratio for DAC application can range from 0.6 to 0.8 on a mass flow basis.

Packing is a core component of the air contactor in a DAC system. Currently available commercial cooling tower packing is suboptimal for DAC applications and its use necessitates that other aspects of the DAC system be modified, such as larger air volumes, packing depth, and air contactor footprint (e.g., the required fill space and structural framework). There are at least two areas where standard commercially available cooling tower packing elements are less effective for DAC: specific surface area and liquid holdup efficiency.

For mass transfer of $CO_2$ from a gas to a liquid, often measured in DAC applications by the $CO_2$ capture flux, a key property that factors into the flux equation is liquid-gas interfacial surface area which is directly related to fill specific surface area and liquid hold-up efficiency.

Fill liquid hold-up efficiency is partially determined by physical wettability which is directly related to surface energy and partially by the completeness of coverage as the liquid travels from the top of the fill to the bottom which is determined by geometry and surface structure of the fill. Compared to metal materials, PVC has a lower surface energy which results in larger contact angles and decreased wetting. As DAC uses low liquid flow rates, surface wettability can be much more critical to performance than in cooling tower applications.

Commercially available cooling tower packing is specifically designed to achieve sufficient wetting under high liquid loading conditions to meet heat transfer objectives. As such, cooling tower packing has demonstrated poor wetting for the low liquid loading rates of interest to DAC applications. At low liquid loading rates, the capture solution can tend towards a rivulet flow regime and form channels as it travels down cooling tower packing. Poor wetting caused by rivulet flow of capture solution can lead to unnecessarily low mass transfer, higher pumping rates to increase liquid flow, and a large air contactor footprint. More importantly, poor wetting by the capture solution can lead to low $CO_2$ uptake.

The properties of the $CO_2$ capture solution are also an important consideration in designing packing for DAC systems. $CO_2$ capture solution, compared to, for example, water (or treated water) as conventionally used in cooling tower applications, is more viscous and denser. Indeed, for a packing designed for DAC, the low concentration of $CO_2$ in ambient air requires a high air flow rate and low pressure drop of fill, while providing a high gas-liquid interfacial area at low solution flow rates (as compared to conventional cooling towers). This decrease in the solution flow rate can change the overall flow pattern from film flow to rivulet flow, which can reduce the gas-liquid interface area available for mass exchange from the $CO_2$ laden air to the $CO_2$ capture solution. The flow rate at which this transition occurs depends on many factors, including the free energy of the solid surface of packing and the density, viscosity, and surface tension of the $CO_2$ capture solution. Such properties in $CO_2$ capture solution differ from those of water, which is the typical liquid in cooling tower applications, due in part to the high concentrations of dissolved sorbents such as caustic sorbents (e.g., KOH or NaOH).

For example, density and viscosity of the $CO_2$ capture solution can vary depending on the composition of such solution and the temperature. For example, at temperatures of 20° C. to 0° C., a capture solution comprising 1 M KOH and 0.5 M $K_2CO_3$ can have a density ranging from 1115-1119 $kg/m^3$ and a viscosity ranging from 1.3-2.3 mPa-s. In another example, at temperatures of 20° C. to 0° C., a capture solution comprising 2 M KOH and 1 M $K_2CO_3$ can have a density ranging from 1260-1266 $kg/m^3$ and a viscosity ranging from 1.8-3.1 mPa-s. In comparison, at temperatures of 20° C. to 0° C., water has a density of 998-1000 $kg/m^3$ and viscosity of 1.0-1.8 mPa-s.

These distinctions present an opportunity to exploit the physical differences between these solutions to develop a DAC-specific fill (i.e., packing) that exhibits the low pressure drops for large air throughput while maximizing gas-liquid interfacial area at liquid loading rates of 0 $L/m^2s$ to 10 $L/m^2s$, which can be effective for $CO_2$ capture. For example, DAC-specific packing can be operable for low liquid loading rates that can range from of 0.5 $L/m^2s$ to 2.5 $L/m^2s$. Such a fill would result in better utilization of the fill surface area (reducing the total material cost) and would reduce the solution pumping and fan power requirements. Such a fill can reduce the number of gas-liquid contactor systems required for a given plant capacity, the quantity of fill required per air contactor, and the air travel depth required for sufficient $CO_2$ uptake.

Thus, it is desirable to design and manufacture packing that will wet fully and evenly given the distinctive process conditions of DAC, including low liquid loading rates and dilute gas concentrations. Packing designed for DAC applications can enable the ability to reduce at least one of air volume, packing depth, liquid flow, and air contactor footprint without significant sacrifice to $CO_2$ uptake performance.

FIG. 1A and FIG. 1B show illustrative examples of interfaces between a packing 106 and other elements of gas-liquid contactors 100a, 100b (collectively and individually 100) according to the present disclosure. Gas-liquid contactor 100 can include elements such as a liquid distribution system 104, a fan 112 and its associated motor, a gas intake 118, a $CO_2$ capture solution 114, packing 106, and a bottom basin 110. In some implementations (not illustrated), gas-liquid contactor 100 can include a housing that partially encloses other elements of gas-liquid contactor 100 and a frame comprising structural members that provide structural stability to gas-liquid contactor 100. Liquid distribution system 104 can include a set of nozzles, a top basin 105, a pressurized header, or a combination thereof, configured to distribute $CO_2$ capture solution 114 onto packing 106. For example, the top basin 105 can hold $CO_2$ capture solution 114 and nozzles positioned at the floor of the top basin 105 can flow $CO_2$ capture solution 114 onto packing 106. $CO_2$ capture solution 114 can flow through the packing material via gravity and be collected in bottom basin 110.

Gas-liquid contactor 100a of FIG. 1A includes a packing section 106 and fan 112 that are configured to flow $CO_2$ capture solution 114 in a counter current flow configuration (also known as counterflow) relative to $CO_2$-laden air. In a counterflow configuration, $CO_2$ capture solution 114 can flow through packing 106 in a direction that is substantially parallel to and opposite of the $CO_2$-laden air. Gas-liquid contactor 100b of FIG. 1B includes a packing section 106 and fan 112 that are configured to flow $CO_2$ capture solution 114 in a crossflow configuration relative to $CO_2$-laden air. In a crossflow configuration, $CO_2$ capture solution 114 can flow through packing 106 in a direction that is substantially nonparallel (e.g., perpendicular) to the $CO_2$-laden air.

$CO_2$ capture solution 114 can be transferred from bottom basin 110 for recirculation (e.g., pumped to liquid distribution system 104), downstream processing (e.g., for regeneration), or a combination thereof. A gas stream (e.g., $CO_2$-laden air) can flow into gas intake 118, through packing 106, and out of gas-liquid contactor 100 outlet by operating fan 112 and its associated motor. In some cases (not illustrated), at least a portion of the outlet of gas-liquid contactor 100 is covered by a drift eliminator material positioned between packing 106 and the outlet to prevent $CO_2$ capture solution 114 from exiting gas-liquid contactor 100 along with the gas stream. In some cases, gas intake 118 can include inlet louvers, protective screens, or a combination thereof.

Gas-liquid contactor configurations that employ packing as described in the present disclosure can include one or more commercially available gas-liquid contacting equipment types, including but not limited to chemical scrubbers, HVAC systems, and cooling towers. Packing can be designed and positioned within a gas-liquid contactor to enable liquid distribution and gas flow in one or more of a crossflow or a counterflow configuration. In some implementations, gas-liquid contactors can include a blower instead of or in addition to a fan to draw $CO_2$-laden air.

Figure 2:
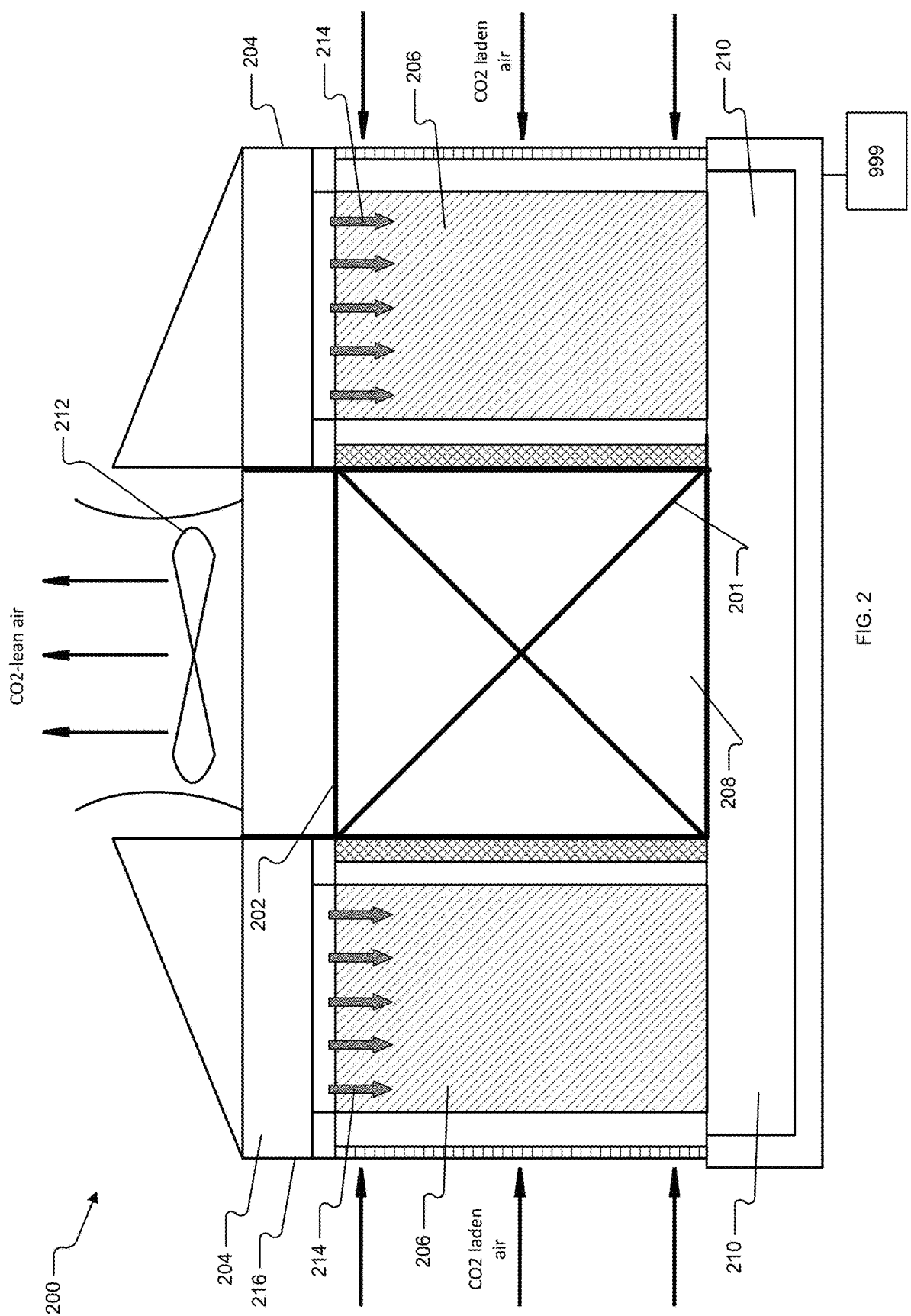
FIG. 2 shows an example gas-liquid contactor according to the present disclosure.

FIG. 2 shows a schematic illustration of an example gas-liquid contactor 200 according to the present disclosure. As shown in this schematic illustration, the gas-liquid contactor 200 includes a frame 202 (e.g., a combination of interconnected structural members 201) that provides structural support and stability to the gas-liquid contactor 200, as well as a housing 216 that, e.g., is at least partially open to an atmosphere, for support of the illustrated components.

One or more top basins 204 are formed into or positioned within the frame 202 at or near the top of the frame 202. Each top basin 204 may at least partially enclose or store a $CO_2$ capture solution 214 (e.g., $CO_2$ sorbent) there within. When stored (at least transiently) within the top basins 204, the $CO_2$ capture solution 214 is positioned to be circulated (e.g., through pumping or gravity flow or both) downwards, through the packing 206 (separated by a plenum 208) and eventually into one or more bottom basins 210. Bottom basins 210 can be positioned adjacent to or near the bottom of the frame 202. The packing 206 can comprise one or more packing sections that include a set of packing sheets. The set of packing sheets can form a packing section that is a three-dimensional structure of packing (e.g., block, column, cube, etc.).

As the $CO_2$ capture solution 214 is circulated through and over the packing 206, $CO_2$ laden air is circulated (e.g., by fan 212) through the packing 206 to contact the $CO_2$ capture solution 214, through the plenum 208, and to an ambient environment as $CO_2$ low air. By contacting these two fluids (for example, in a crossflow configuration as shown), $CO_2$ within the $CO_2$ laden air is transferred to the $CO_2$ capture solution 214. In some implementations (not illustrated), one or more redistribution systems can be positioned below the one or more top basins and between the one or more packing sections or between packing sheets. The redistribution system can include alternate packing, trickle packing, splash fill, spray nozzles and piping, liquid basins and nozzles, or a combination thereof.

In some embodiments, $CO_2$ capture solution 214 and $CO_2$ laden air can be contacted in a counterflow configuration (not illustrated). In implementations including a counterflow configuration, $CO_2$ laden air enters the packing 206 at or near the bottom basin 210. The $CO_2$ laden air is circulated through the packing 206 in an average flow direction that is parallel and counter current to the average flow direction of $CO_2$ capture solution 214. For example, the $CO_2$ laden air can have an average flow direction that is vertically upward through the packing 206, counter to the $CO_2$ capture solution 214 that has an average flow direction that is vertically downward. In some counterflow configurations, an intake plenum can be positioned below the packing 206 and adjacent to where the $CO_2$ laden air enters. In some cases, a discharge plenum can be positioned above the packing 206.

A gas-liquid contactor in a counterflow configuration can include a capture solution distribution system positioned at least partially below a fan that draws the $CO_2$ laden air into the intake plenum. The capture solution distribution system can include a distribution pipe that feeds a set of nozzles or spargers distributing capture solution over the packing 206. In some cases, the capture solution distribution system in a counterflow configuration can gravity-feed capture solution to the packing 206.

The bottom basin 210 at the bottom of the gas-liquid contactor 200 acts as a collection tank for the $CO_2$ capture solution 214, where the solution is collected and then pumped back for distribution over the contactor packing to capture more $CO_2$, to a downstream process for further processing, or a combination thereof.

In some cases, lowering the surface tension of the $CO_2$ capture solution 214 closer to that of water would improve the ability of the solution to wet the packing material. Adjusting the surface tension of the $CO_2$ capture solution 214 may be accomplished by diluting the concentration or adding a surfactant.

The process streams in the gas-liquid contactor systems, as well as process streams within any downstream processes with which the gas-liquid contactor systems are fluidly coupled, can be flowed using one or more flow control systems (e.g., control system 999) implemented throughout the system. A flow control system can include one or more flow pumps, fans, blowers, or solids conveyors to move the process streams, one or more flow pipes through which the process streams are flowed and one or more valves to regulate the flow of streams through the pipes. Each of the configurations described herein can include at least one variable frequency drive (VFD) coupled to a respective pump that is capable of controlling at least one liquid flow rate. In some implementations, liquid flow rates are controlled by at least one flow control valve.

In some embodiments, a flow control system can be operated manually. For example, an operator can set a flow rate for each pump or transfer device and set valve open or close positions to regulate the flow of the process streams through the pipes in the flow control system. Once the operator has set the flow rates and the valve open or close positions for all flow control systems distributed across the system, the flow control system can flow the streams under constant flow conditions, for example, constant volumetric rate or other flow conditions. To change the flow conditions, the operator can manually operate the flow control system, for example, by changing the pump flow rate or the valve open or close position.

In some embodiments, a flow control system can be operated automatically. For example, the flow control system can be connected to a computer or control system (e.g., control system 999) to operate the flow control system. The control system can include a computer-readable medium storing instructions (such as flow control instructions and other instructions) executable by one or more processors to perform operations (such as flow control operations). An operator can set the flow rates and the valve open or close positions for all flow control systems distributed across the facility using the control system. In such embodiments, the operator can manually change the flow conditions by providing inputs through the control system.

Also, in such embodiments, the control system can automatically (that is, without manual intervention) control one or more of the flow control systems, for example, using feedback systems connected to the control system. For example, a sensor (such as a pressure sensor, temperature sensor, leak detection sensor or other sensor) can be connected to a pipe through which a process stream flows. The sensor can monitor and provide a flow condition (such as a pressure, temperature, or other flow condition) of the process stream to the control system. In response to the flow condition exceeding a threshold (such as a threshold pressure value, a threshold temperature value, or other threshold value), the control system can automatically perform operations. For example, if the pressure or temperature in the pipe exceeds the threshold pressure value or the threshold temperature value, respectively, the control system can provide a signal to the pump to decrease a flow rate, a signal to open a valve to relieve the pressure, a signal to shut down process stream flow, or other signals.

Figure 3:
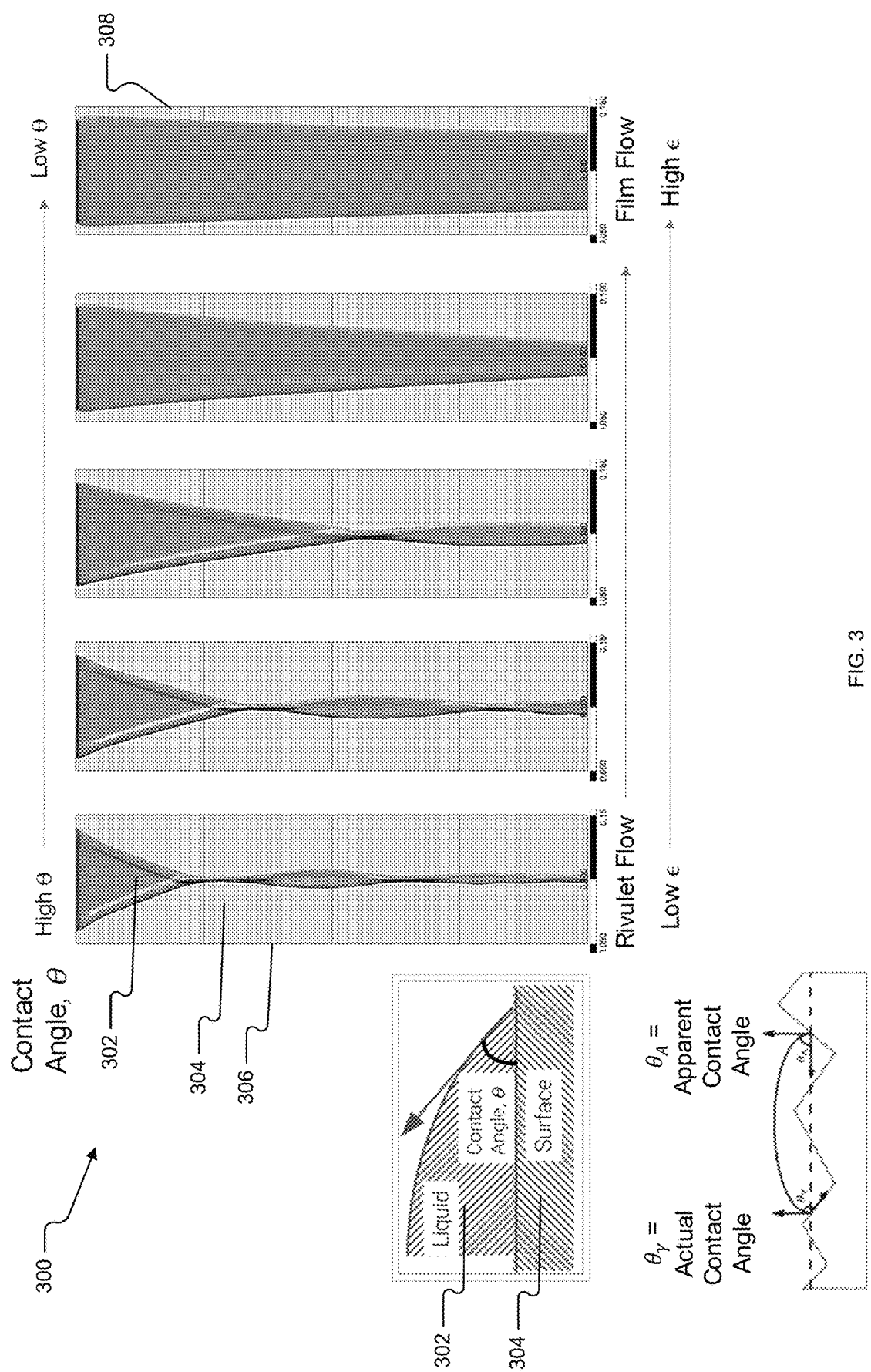
FIG. 3 shows a chart depicting an example effect of contact angle on flow regime of capture solution on a packing surface.

For example, FIG. 3 shows a chart 300 depicting the effect of contact angle on flow regime of capture solution (flow) 302 on packing surface 304 for a gas-liquid contactor system, such as gas-liquid contactor 100 shown in FIGS. 1A-1B. One cause of poor wetting is low surface energy of the packing. Surface energy describes the strength of intermolecular bonds at the surface of a material and is the energy required to increase the degree of surface exposure. If a material has high surface energy, its bulk interactions can be stronger and its surface exposure can be greater. This can result in better wetting and hydrophilicity (e.g., tending to attract water). If a material has a low surface energy, its bulk interactions can be weaker and its surface exposure can be smaller. Poor wetting and hydrophobicity (e.g., tending to repel or not mix with water) are usually associated with a high contact angle. Contact angle is defined as the angle between the liquid-solid interface and the liquid-vapor interface, measured through the liquid, as shown in FIG. 3. The contact angle can affect the flow regime of the $CO_2$ capture solution flowing on the packing. For instance, a high contact angle (e.g., of greater than 70 degrees and less than 150 degrees) can result in rivulet flow, whereas a low contact angle (e.g., of greater than 20 degrees and less than 50 degrees) can result in film flow.

For example, for superhydrophobic surfaces, the contact angle can be more than 150 degrees. For example, for superhydrophilic surfaces, the contact angle can be less than 20 degrees. A high contact angle typically correlates to a flow regime that is closer to rivulet flow 302 and a low wetting fraction $\varepsilon$ (i.e., wetted surface area), whereas a lower contact angle typically correlates to a flow regime that is more like film flow 308 and a high wetting fraction. A low contact angle and hydrophilicity generally signifies a high interface area to liquid loading ratio.

Since the wetted surface area determines the amount of exposure of capture solution to $CO_2$ in the air, and a hydrophilic surface increases the wetted area for a given volume of solution, hydrophilic materials can be used for packing 304 for the gas-liquid contactor. Hydrophilic coatings increase surface energy and lower the contact angle. Some surface treatments that expose a material to change bonds on its surface can achieve similar results as well.

In some aspects, the gas-liquid contactor including packing 304 (as a hydrophilic packing) can increase the $CO_2$ capture flux (e.g., by 10% to 30%) through an increase in specific surface area of the packing 304 by adopting fill shapes more suitable to low liquid flow rates while maintaining or improving pressure drop across the fill, and/or an increase of fill liquid holdup efficiency by managing fill geometry, surface structure and surface energy by developing shape designs, fill PVC resin and vinyl compounds, and surface treatments optimized for low flow rate caustic solutions. Design criteria of the hydrophilic packing 304 that reflect good performance can include but are not limited to: low static pressure design, ability to distribute liquid evenly throughout fill height, low fouling capabilities, increase in air contacting efficiency, lower material requirements, and manufacturability.

Thus, in some cases, the packing 304 in gas-liquid contactor can be designed, constructed, and/or modified to exhibit or include hydrophilicity (and decreased contact angle) as opposed to hydrophobicity (and increased contact angle) with the $CO_2$ capture solution. Such designs also improve wetting of the packing 306 with the $CO_2$ capture solution. Improved wetting (e.g., increasing the wetted surface area) of packing 306 can be achieved by at least two approaches. The first approach is to increase the hydrophilicity of the surface via increasing the surface free energy by applying coatings, for example. The second is to increase the surface roughness and the apparent contact angle. The apparent contact angle is the angle between the apparent solid surface (as opposed to the actual solid surface) and the liquid-gas interface, as shown in FIG. 3. These approaches can be used independently or in combination with one another.

In some cases, packing can be difficult to treat (i.e., difficult to adhere a coating to). In some implementations, packing coatings can be suitable in improving mass transfer for DAC applications where $CO_2$ capture solution is distributed at liquid loading flow rates including, but not limited to, 0 $L/m^2s$ to 10 $L/m^2s$. For example, packing coatings can be suitable for low liquid loading rates ranging from 0.5 $L/m^2s$ to 2.5 $L/m^2s$. These packing coatings can also be beneficial for distributing capture solution to packing having an example packing depth of 2-10 meters. In an example implementation, the packing can include an applied hydrophilic coating to increase hydrophilicity.

Figure 4:
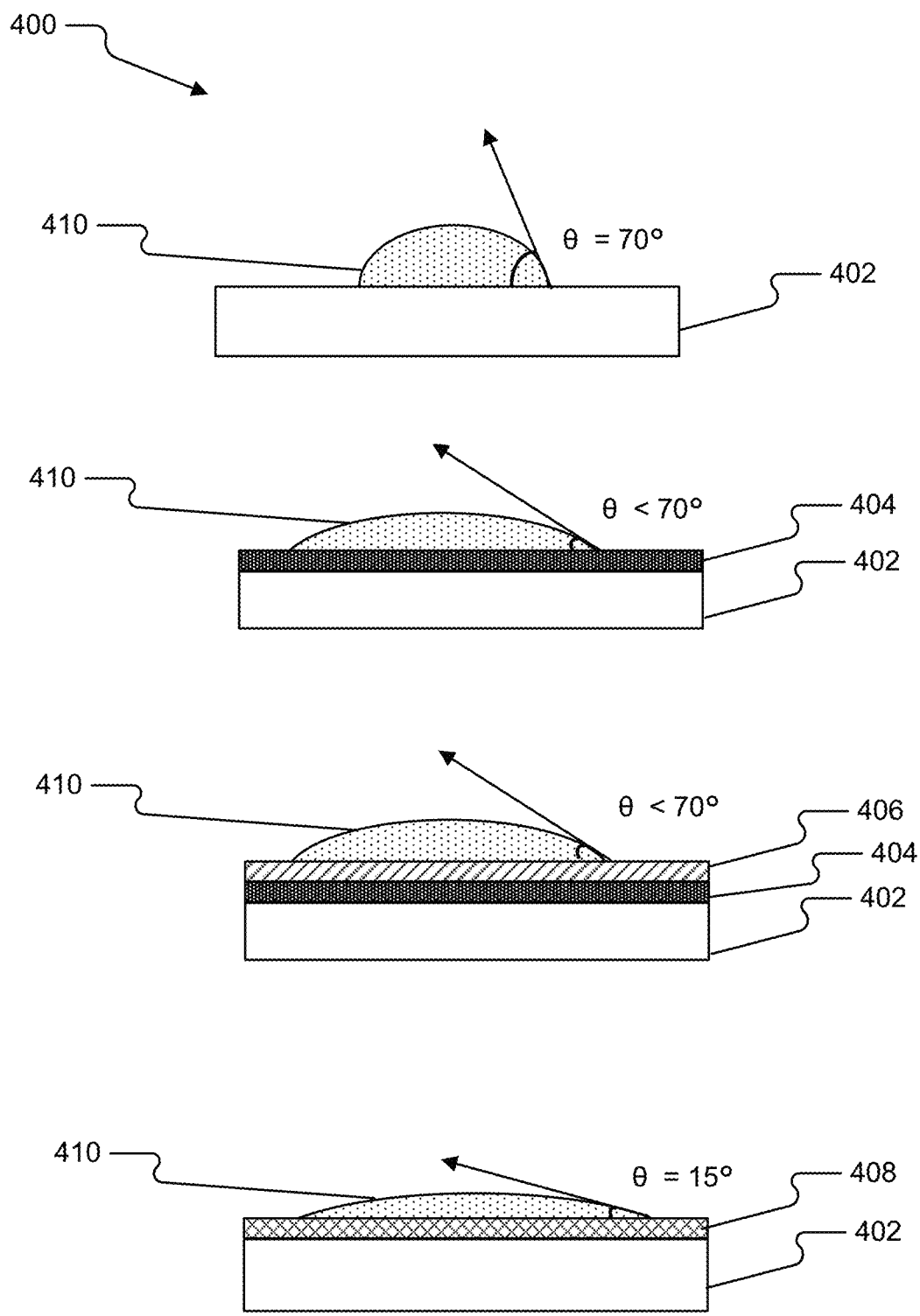
FIG. 4 shows examples of coatings and contact angles of capture solution on an uncoated surface, a surface coated with one or more acrylic layers, and a surface with a fouling layer.

For example, FIG. 4 shows examples of hydrophilic coatings 400 and contact angles of capture solution 410 on surfaces of packing for a gas-liquid contactor system, such as gas-liquid contactor 100 shown in FIGS. 1A-1B. FIG. 4 shows a surface 402 that is uncoated, a surface 402 coated with a first acrylic layer 404, a surface 402 coated with layered acrylic coatings, and a surface 402 that has a fouling layer 408. In an example implementation, layered acrylic coatings can include first acrylic layer 404 and a second acrylic layer 406. In an example implementation, surface 402 can comprise PVC or another thermoplastic. In some cases, an uncoated packing surface 402 can have a contact angle θ of greater than 65 degrees to less than 80 degrees. In some cases, coatings can reduce contact angle θ to less than 65 degrees. For example, an uncoated packing surface 402 can have a contact angle of 75 degrees and a coating can reduce the contact angle to 35 degrees.

A type of hydrophilic coating that can be applied to the packing surface 402 is an acrylic coating. Acrylic coatings are a class of coatings that can increase the hydrophilicity of packing. Some of these coatings are commercially available for purposes unrelated to industrial heat removal or chemical separations.

Two examples of such acrylic coatings include NeoPac and NeoCryl. NeoPac is a high solids waterborne urethane-acrylic hybrid copolymer. When applied to a PVC packing, NeoPac can achieve a contact angle of more than 7 degrees and less than 35 degrees, depending on whether NeoPac is applied alone, as an acrylic layer, or as a blended layer. NeoCryl is a self-crosslinking acrylic copolymer emulsion. When applied to a PVC packing, NeoCryl can achieve a contact angle of more than 40 degrees and less than 65 degrees, depending on whether NeoCryl is applied alone, as an acrylic layer, or as a blended layer. In some cases, acrylic coatings can be blended and/or layered over one another. For example, a first acrylic layer 404 can include mostly urethane-acrylic hybrid copolymer and a second acrylic layer 406 can include mostly self-crosslinking acrylic copolymer emulsion. In another example, a first acrylic layer 404 may include mostly urethane-acrylic hybrid copolymer and a second acrylic layer 406 may include a blend of urethane-acrylic hybrid copolymer and self-crosslinking acrylic copolymer emulsion. Some examples of blend ratios of urethane-acrylic hybrid copolymer to self-crosslinking acrylic copolymer emulsion can include 20/80, 80/20, or 50/50, but other ratios may also be suitable.

In some aspects, a hydrophilic coating can include a fouling layer 408 that can increase surface roughness and reduce contact angle of capture solution 410 on surface 402. For example, in some DAC applications where calcium carbonate ($CaCO_3$) chemistry is involved, the packing surface can be conditioned. Conditioning is a naturally occurring fouling of the packing surface that leads to a layer of $CaCO_3$ and other buildup that increases the wetted surface area by way of increasing surface roughness. For example, fouling layer 408 may reduce the contact angle to between 10 degrees and 40 degrees. The resulting flow is more film-like than the rivulet flow of new packing that is uncoated and unconditioned (i.e., packing that is smooth and does not have a fouling layer or buildup).

Figure 5:
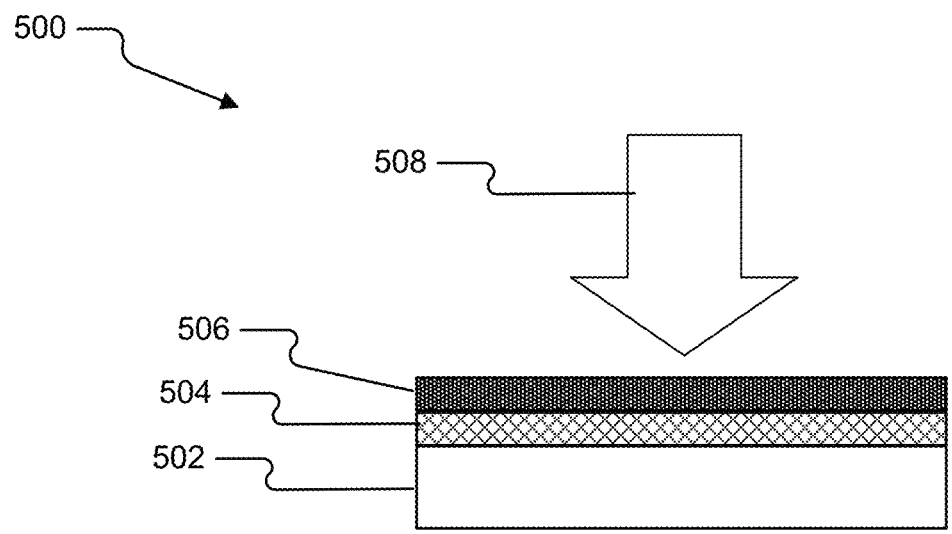
FIG. 5 shows an example cellulose-coated packing.

Another example of a hydrophilic coating is a cellulose coating. For example, FIG. 5 shows an example cellulose-coated packing 500 for a gas-liquid contactor system, such as gas-liquid contactor 100 shown in FIGS. 1A-1B. Coated packing 500 includes a bonding layer 504 and a cellulose layer 506 on a plastic substrate 502 such as a packing sheet. For example, a coating that comprises a bonding layer 504, such as ethylene vinyl acetate (EVA), and a thin layer of cellulose 506 adheres well to PVC. Glue-on coatings, such as EVA, are not conventionally used as a coating material for PVC packing in the cooling tower or chemical processing industries. EVA and similar glue-on coatings are typically used in lamination of glass structures in building construction and transportation industries. In some cases, EVA can be applied to a plastic substrate 502 of any sufficiently structurally strong material (e.g., the packing). In one approach, the layer of cellulose 506 (single ply as used in some retail paper products) can be hot rolled on to the plastic substrate with a hot roller 508. This process is done to both sides of the plastic substrate 502. A coating comprising cellulose layer 506, bonding layer 504, and plastic substrate 502 can each be fully compatible with high strength caustic solutions like KOH and NaOH. In some cases, this coating increases wetting with a low flow of capture solution, which can result in higher capture rates.

Cellulose coated packing 500 includes a bonding layer 504, which is the laminating plastic, intervenes the cellulose layer 506 and the plastic substrate 502. The bonding layer 504 can include EVA and the bonding layer 504 can have a thickness of 30-100 μm. The cellulose layer 506 thickness can be approximately 50-100 μm. Cellulose is a suitable material for coating packing because it is hydrophilic, can wick solution, and is inexpensive. An important consideration is that the structural integrity of cellulose is compatible with alkaline capture solutions because it does not disintegrate in high concentration caustic fluids. Also, cellulose can be easily extracted from the Kraft process (which includes similar chemistry and reactions to some DAC processes). In some cases, EVA can be a suitable bonding layer because it is one of the least expensive polymers and can bond to any kind of plastic substrate, including PVC and non-PVC plastic substrates. EVA is compatible with caustic solutions and is rated for high pH conditions. In some cases, a different adhesive or bonding material may be used in the bonding layer 504 instead of EVA. For example, a PVC glue may be suitable.

In an example process for applying the cellulose layer 506 to a plastic substrate 502 (i.e., the packing), first, a bonding layer 504 (e.g., an EVA layer having a thickness of at least 30 um) is placed on the plastic substrate 502 (e.g., PVC). Next, the bonding layer 504 is heated to a bonding temperature ranging from 80° C. to 130° C. Next, the cellulose layer 506 is placed over the bonding layer 504. Next, the cellulose layer 506 is pressed to the bonding layer 504 using a hot roller 508. This can form a strong bond of cellulose 506 to the plastic substrate 502.

Figure 6:
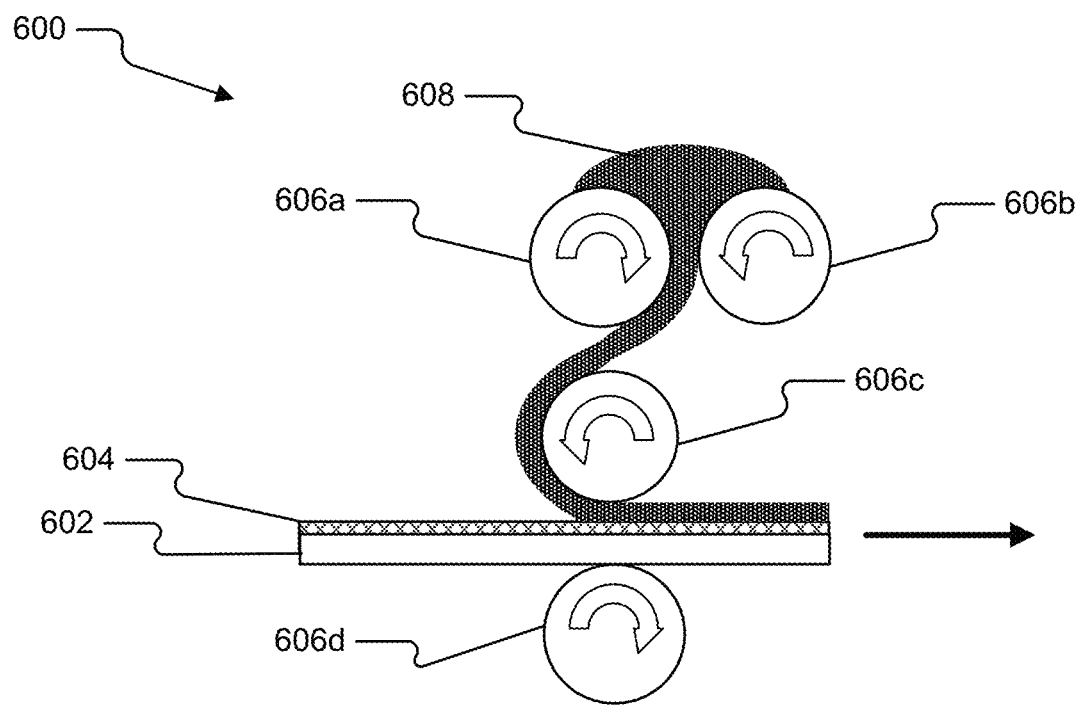
FIG. 6 shows an example calendering process.

In one example, a calendering process 600 can be used to apply the cellulose 604 and the bonding material 608 (e.g., EVA or PVC glue) onto the plastic substrate or packing sheet 602 (e.g., PVC layer). FIG. 6 shows the example calendering process 600 for manufacturing packing for a gas-liquid contactor system, such as gas-liquid contactor 100 shown in FIGS. 1A-1B. In the process of calendering the packing sheet 602, it is possible to add an outside layer of another polymer to the packing sheet 602. Also, the packing sheets 602 can be shaped into a pattern, such as corrugations, flutes, herringbone, or channels, using rollers in a process similar to calendaring.

As shown in FIG. 6, a calender is a series of hard pressure rollers 606a, 606b, 606c, 606d (collectively 606) used to finish or smooth a sheet of material such as paper, textiles, or plastics. Calender rolls 606 are also used to form some types of plastic films and to apply coatings. Some calender rolls 606 are heated or cooled as needed. In some aspects, a calendering process 600 can be performed on both sides of packing sheet 602. In some implementations, the packing sheets 602 can be shaped into a pattern (e.g., corrugations, flutes, herringbone, or channels) using a vacuum-forming process. Packing sheets 602 can be positioned to contact one another to form channels or flutes that are operable to carry a $CO_2$ capture solution. Contact between packing sheets 602 can be uninterrupted or be intermittent at points along the pattern. Packing sheets 602 can be positioned to form a packing section in an approach that is similar to the one described in FIG. 7.

Rather than or in addition to coatings, at least a portion of the surface of a material can be exposed to some surface treatments (not illustrated), which can lead to a change in bonds at the surface to improve hydrophilicity. Examples of such surface treatments are plasma, flame, and corona treatments, and some chemical treatments with oxidizing agents. Some examples of surface treatments can be mechanical treatments, such as bead-blasting and embossing. A surface treatment can be applied directly to a surface of a packing layer. In some cases, a surface treatment can be applied to a coating that is on the surface of a packing layer, particularly if the coating is responsive to the surface treatment (e.g., contact angle is reduced and hydrophilic properties of the coating improve).

Rather than or in addition to coatings and surface treatments, a material composition (not illustrated) for packing can be selected to improve hydrophilicity. For example, a particular PVC resin and/or vinyl compound may have a higher surface energy and increased wettability than some conventional thermoplastics (e.g., acrylic, polyester, polypropylene, polystyrene, nylon and Teflon) that are used to form commercially available cooling tower packing. Contact angle can be used to determine surface energy of the material, which is one of the contributors to fill hold-up efficiency. A packing material feedstock, which can be in the form of a vinyl sheet roll stock, comprising the high surface energy PVC resin and/or vinyl compound can shaped using a mold and vacuum forming device and used as layers in the packing.

In addition to or alternatively to the example hydrophilic configurations of packing described previously, surface roughness can also be used to adjust contact angle of capture solution to packing and increase the wetted surface area. The shape of a surface of the packing can be exploited to adjust the apparent contact angle. A packing layer can have large macrostructures to affect the 'macro' flow and/or have microstructures on its surface to affect the contact angle. Macrostructures can include patterns such as corrugations, flutes, herringbone, or channels that affect the tendency of the liquid to move backward, forward, or straight down within the packing depending on the air velocity and the packing's rigidity. Microstructures are small-scale patterns or structures that can reduce the apparent contact angle and enable film flow of capture solution.

A textured surface of a packing layer can be achieved by superimposing microstructures on flat packing or on packing with macrostructures. Macrostructures, microstructures, or hydrophilic coatings (such as the aforementioned acrylic, EVA and cellulose coatings) can be used in independently or in combination each other to increase the wetted surface area of packing. Several macrostructures and microstructures are particularly suitable improving mass transfer for DAC applications where the $CO_2$ capture solution is distributed at liquid loading flow rates ranging, for example, from 0 $L/m^2s$ to 10 $L/m^2s$ and distributed to packing having a packing depth of, for example, 2-10 meters. In some cases, macrostructures and microstructures in packing are suitable for liquid loading rates of 0.5 $L/m^2s$ to 2.5 $L/m^2s$.

Figure 7:
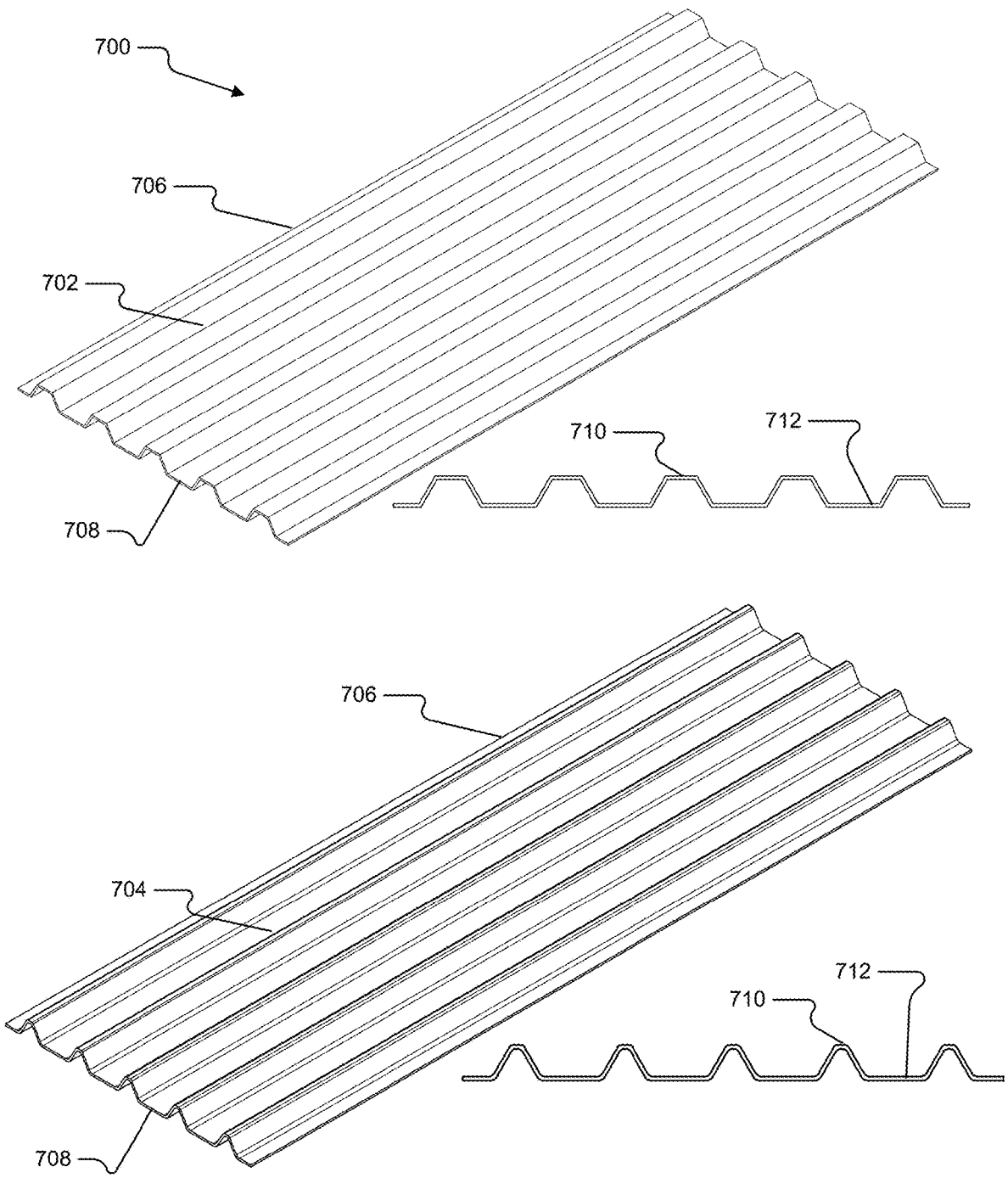
FIG. 7 shows example corrugated packing sheets having a corrugated edge and a smooth edge.

An example of packing with macrostructures is corrugated packing 700. For example, FIG. 7 show perspective views of corrugated packing sheets 702, 704, and front views of corrugated edge 708 of packing for a gas-liquid contactor system, such as gas-liquid contactor 100 shown in FIGS. 1A-1B. Corrugated packing sheets 702 and 704 have at least one corrugated edge 708 and at least one smooth edge 706. Smooth edge 706 can be substantially perpendicular to the corrugated edge 708. Corrugated packing sheets 702 and 704 can have corrugations that form certain cross-sectional shapes that have peaks 710 and valleys 712, as depicted by front views of corrugated edge 708. Example corrugated packing layer 702 includes trapezoidal corrugations. Example corrugated packing layer 704 includes triangular corrugations. In some cases, corrugated packing sheets can form both trapezoidal and triangular corrugations. In some cases, corrugated edges 708 can form other cross-sectional shapes that are not illustrated.

Corrugated packing sheets 702, 704 can be suspended so that solution flows down along the corrugations 708 in a direction that is substantially parallel to the smooth edge 706 (e.g., stream-wise corrugations). In this case, only the tensile strength of packing sheets 702, 704 needs to be considered since stream-wise corrugations are relatively unaffected by the load of the liquid. In some cases, corrugated packing sheets 702, 704 having corrugations can be positioned so that solution flows across the corrugations in a direction that is substantially parallel to the corrugated edge (e.g., cross-stream corrugations).

In some aspects of packing, packing sheets can be hung from a horizontal hanging rod so that the corrugated edge of the corrugated packing sheet is aligned with the axis of the hanging rod (similar to curtains). In some implementations, packing sheets can be hung at least 0.2 inches from one another. For example, packing sheets can be hung at least 0.5 inches from one another. For example, packing sheets can be hung 0.25 inches from one another. Spacing between the sheets can determine differential pressure (small spacing results in higher differential pressure). Sheets should be arranged so that corrugations of sheets are at least partially aligned with one another. For example, the distance between the peak of a first corrugated sheet and the peak of a second corrugated sheet can be comparable to the distance between the valley of the first corrugated sheet and the valley of the second corrugated sheet. The $CO_2$ capture solution can be distributed by flowing from the top basin 204 or via an atomized feed (co-current or counter-current with gas flow).

Other examples of macrostructures in a packing section include channels or flutes. In some aspects, one corrugated sheet 702, 704 can be positioned to contact another corrugated sheet 702, 704 such that channels, which are operable to carry a capture solution, are formed by the corrugations. In some implementations, the corrugated sheets 702, 704 can rest against one another. In some implementations, the corrugated sheets 702, 704 can be fixed (e.g., mechanically attached) to one another. For example, peaks 710 of the corrugations of a corrugated sheet 702, 704 can at least partially contact the valleys 712 of the corrugations of another corrugated sheet 702, 704, thereby forming flutes or channels there between. Contact between corrugated sheets 702, 704 can be uninterrupted or be at intermittent points along the corrugations. A packing section can comprise packing sheets forming channels that are less steep (enabling more gradual flow of capture solution) than channels formed in conventional packing. For example, the packing section can include 15 degree channels (as opposed to 45 degree channels typically seen in conventional cooling tower packing). In some implementations, macrostructures can include dimensions ranging from 0.5 inches to 4 inches. For example, corrugations can have a width of 1 inch and a height of 0.5 inches.

Figure 8:
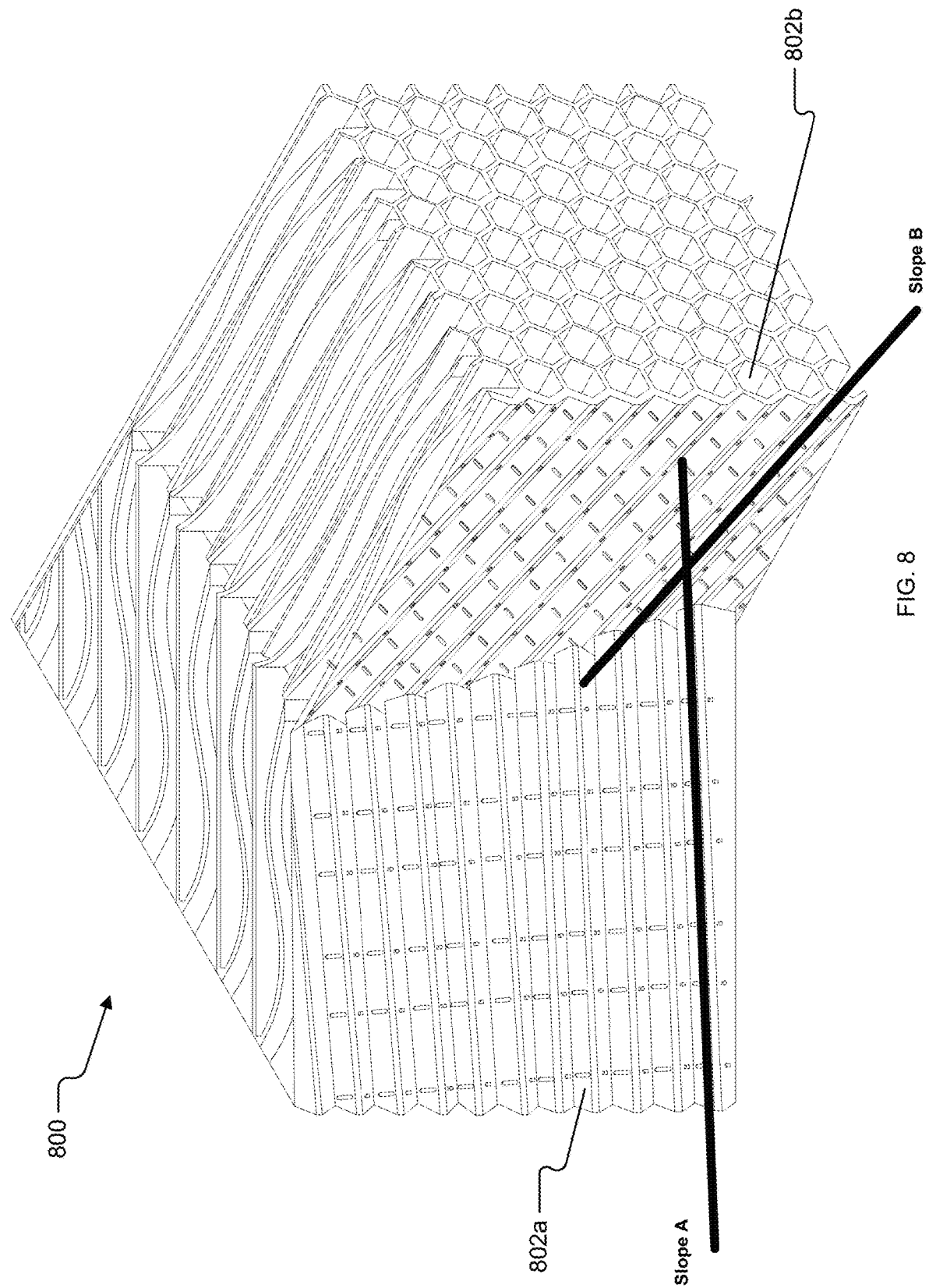
FIG. 8 shows an example packing section comprising packing sheets that form gradual channels.

FIG. 8 shows a packing section 800 comprising packing sheets that form one or more sets of gradual channels 802a, 802b (collectively 802) for a gas-liquid contactor system, such as gas-liquid contactor 100 shown in FIGS. 1A-1B. In some cases, packing section 800 can include gradual channels 802 and an optional hydrophilic coating (such as coatings 400 as described with reference to FIG. 3). Gradual channels 802 can improve liquid distribution to vertical faces of the packing section 800 (i.e., improve liquid distribution front to back). Gradual channels 802 can also decrease pressure drop. In some cases, a hydrophilic coating or a surface treatment can be applied to at least a portion of one or more packing sheets before they are assembled into the packing section 800 that includes gradual channels 802. Gradual channels 802 can include channels that are at an angle (e.g., slope) of equal to or less than 45 degrees. For example, gradual channels 802 can be selected from a range of about 15 degrees to about 45 degrees.

In some implementations, a first set of gradual channels 802a is positioned at an angle that is lower than that of a second set of gradual channels 802b. For example, first set of gradual channels 802a can be positioned at an angle of 15 degrees and second set of gradual channels 802b can be positioned at a different angle that is 45 degrees or less (i.e., slope A is 15 degrees and slope B is 45 degrees or less). In some implementations, the first set of gradual channels 802a and the second set of gradual channels 802b are positioned at similar angles. For example, both the first and second set of gradual channels 802 are positioned at an angle of about 15 degrees (i.e., slope A and slope B are both about 15 degrees). In some cases, the first set of gradual channels 802a are at a nonparallel angle to the second set of gradual channels 802b. In some cases, including but not limited to the aforementioned implementations, the channel angles can be adjusted within the current 45 degree to 15 degree range to affect the liquid distribution for process set points (air velocity and liquid flow).

Figure 9:
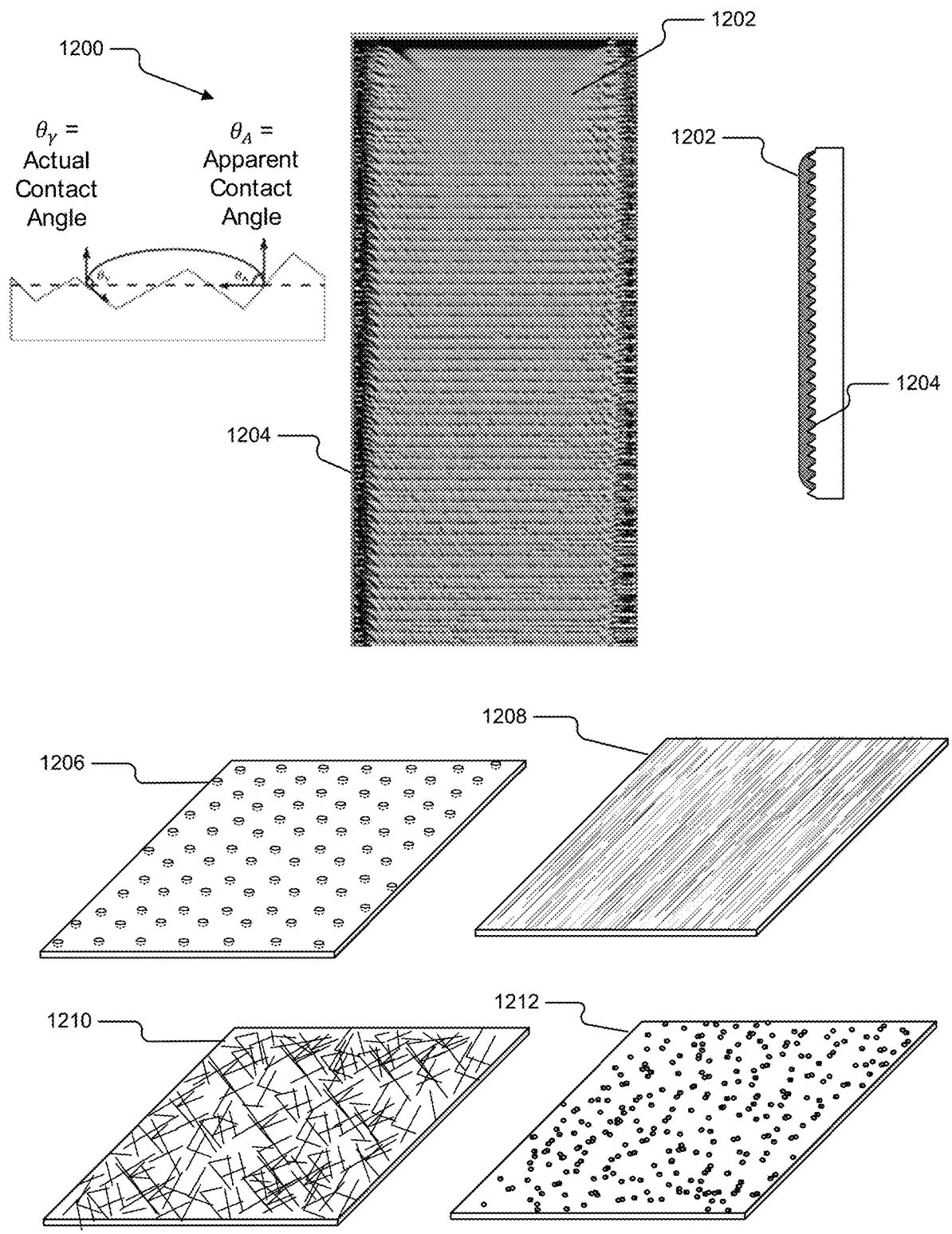
FIG. 9 shows examples of microstructures on a packing sheet.

Microstructures can be superimposed on macrostructures to increase wetted surface area on a packing sheet. FIG. 9 shows examples of microstructures 1200 on a packing sheet for a gas-liquid contactor system, such as gas-liquid contactor 100 shown in FIGS. 1A-1B. Microstructures 1200 on the packing 106 can be very small-scale features that improve the capture solution 1202 wetting through the effect of the apparent contact angle (as opposed to the actual contact angle). The size of microstructures 1200 can be on the scale of millimeters, as opposed to macrostructures which can range from 0.5 inches to 4 inches.

An example of microstructures 1200 that can be used to achieve a low apparent contact angle are ridges 1204. In some implementations, ridges 1204 can have widths of less than 10 mm. For example, ridges 1204 can be sized between 1 mm to 2 mm. Ridges 1204 are cross-stream ridges that can be used to achieve better wetting by capture solution 1202 in comparison to a surface without microstructures. For example, FIG. 9 shows a comparison of liquid flow on regular flat packing sheets with liquid flow on 1 mm cross flow ridges in packing sheets.

Some microstructures 1200 can protrude from the packing layer surface. In some implementations, microstructures 1200 protruding from the packing layer surface can include a material that is different from the packing layer surface. For example, granules 1212 or fibres 1210 can be introduced to the packing layer during manufacturing to increase surface roughness of a packing layer that is initially smooth. Adding fibres 1210 to a packing layer can achieve a texture that is similar to a fiberglass sheet. Some microstructures can depress into the packing layer surface. For example, dimples 1206, etches 1208, pores, perforations, or combinations thereof can be introduced to increase surface roughness of a packing layer that is initially smooth. A packing layer can be etched using a roller wire brush or other similar tools with fine rigid components. The sizes, spacings, and shapes of these microstructures are selected to lower the apparent contact angle (e.g., to 50 degrees or less) for liquid loading flow rates ranging from, for example, 0 $L/m^2s$ to 10 $L/m^2s$. In some cases, the microstructures are configured to lower the contact angle for low liquid loading rates ranging from 0.5 $L/m^2s$ to 2.5 $L/m^2s$.

Figure 10:
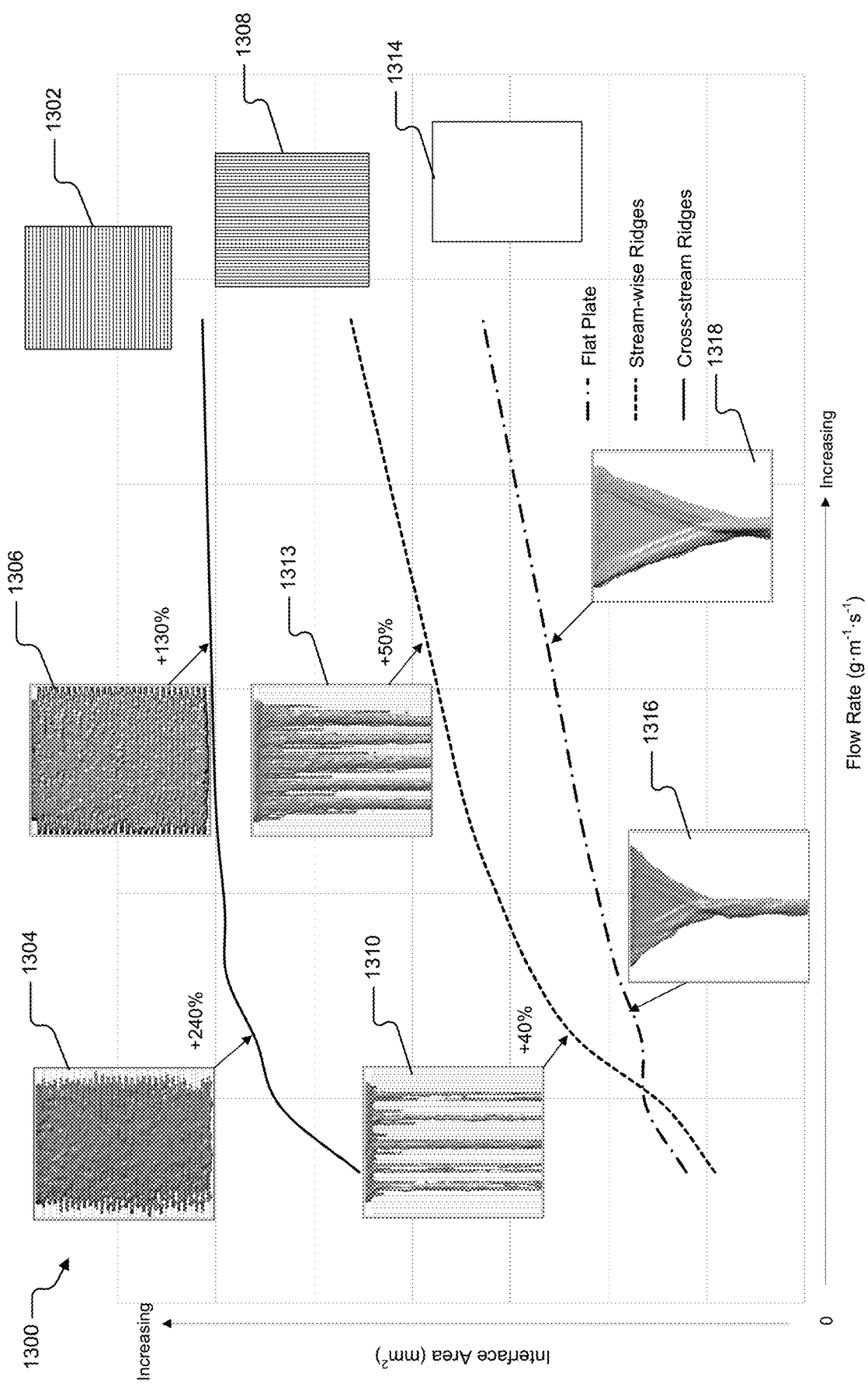
FIG. 10 shows a chart comparing contact area of example packing sheets that have cross-stream ridges, stream-wise ridges, and no ridges (flat) at high and low flow rates of capture solution.

For example, FIG. 10 shows a chart 1300 comparing contact area of packing having cross-stream ridges 1302, stream-wise ridges 1308, and no ridges (flat) 1314 at high and low flow rates of capture solution for a gas-liquid contactor system, such as gas-liquid contactor 100 shown in FIGS. 1A-1B. Cross-stream ridges 1302 and stream-wise ridges 1308 form narrow raised bands on the surface of a packing sheet that have a size on the order of millimeters. Ridges can be described with respect to how the bands are oriented relative to a liquid flow direction. Cross-stream ridges 1302 can be oriented in a direction substantially nonparallel to the $CO_2$ capture solution flow direction. In some cases, cross-stream ridges 1302 can be oriented perpendicular to the $CO_2$ capture solution flow direction. Stream-wise ridges 1308 can be oriented in a direction that is substantially parallel to a direction of liquid flow.

At high liquid flow rates, cross-stream ridges 1306 can achieve a greater wetted surface area (interface area) than streamwise ridges 1312 and flat plate 1318. Likewise, at low flow rates, cross-stream ridges 1304 can achieve a greater wetted surface area (interface area) than streamwise ridges 1310 and flat plate 1316. Low flow rates of capture solution are preferred in the gas-liquid contactor 100 to reduce liquid pumping requirements; thus, packing that includes cross-stream ridges 1302 may be more beneficial under these operating conditions than packing that includes streamwise ridges 1308 or flat plates 1314. In some cases, streamwise ridges 1308 can be beneficial for directing the gas flow or redirecting the $CO_2$ capture solution flow. Modeling shows that 1 mm cross-stream ridges 1302 can achieve a wetting fraction of >0.95 by slanting the contact surface so that a small apparent contact angle is attained. Stream-wise ridges 1308 can improve wetting relative to flat packing 1314, but the improvement is less significant than cross-stream ridges 1302.

Microstructures and/or macrostructures can be shaped through one or more processes. An example process is mold and vacuum forming. In an example aspect, this process includes the steps of: creating a mold that has the inverse of both macrostructures and microstructures (e.g., using a 3-D printer); heating a sheet of packing material (e.g., thermoplastic such as PVC that is blank/flat) to a forming temperature of 110° C. to 150° C.; stretching the sheet of packing material to the mold; and applying a vacuum to force the sheet of packing material against the mold. In another example aspect, this process includes the steps of: creating a mold that has the inverse of only the macrostructures (e.g., using a 3-D printer); heating a sheet of packing material already comprising the microstructures (e.g., thermoplastic sheet with dimples or 1 mm ridges) to a forming temperature; placing the sheet of packing material to the mold; and apply a vacuum to bring the sheet of packing material against the mold.

In another example aspect, this process includes the steps of: creating a mold that has the inverse of only the microstructures (e.g., using a 3-D printer); heating a sheet of packing material (e.g., blank/flat thermoplastic sheet) to a forming temperature; applying the sheet of packing material to the mold; and applying a vacuum to force the sheet of packing material against the mold. The mold can come in a range of sizes from 2"×2" up to at least 10'×10'. In some aspects, a size of the printed molds may be 2'×2' mold or a 6"×6" mold.

As another example process, the packing 106 may be printed directly including printing the macrostructures and/or microstructures using a 3-D printer. In another example process, the packing 106 may be 3-D printed with soft tooling (e.g., clay), or hard tooling that can each be used to produce a mold for manufacturing packing.

Figure 11:
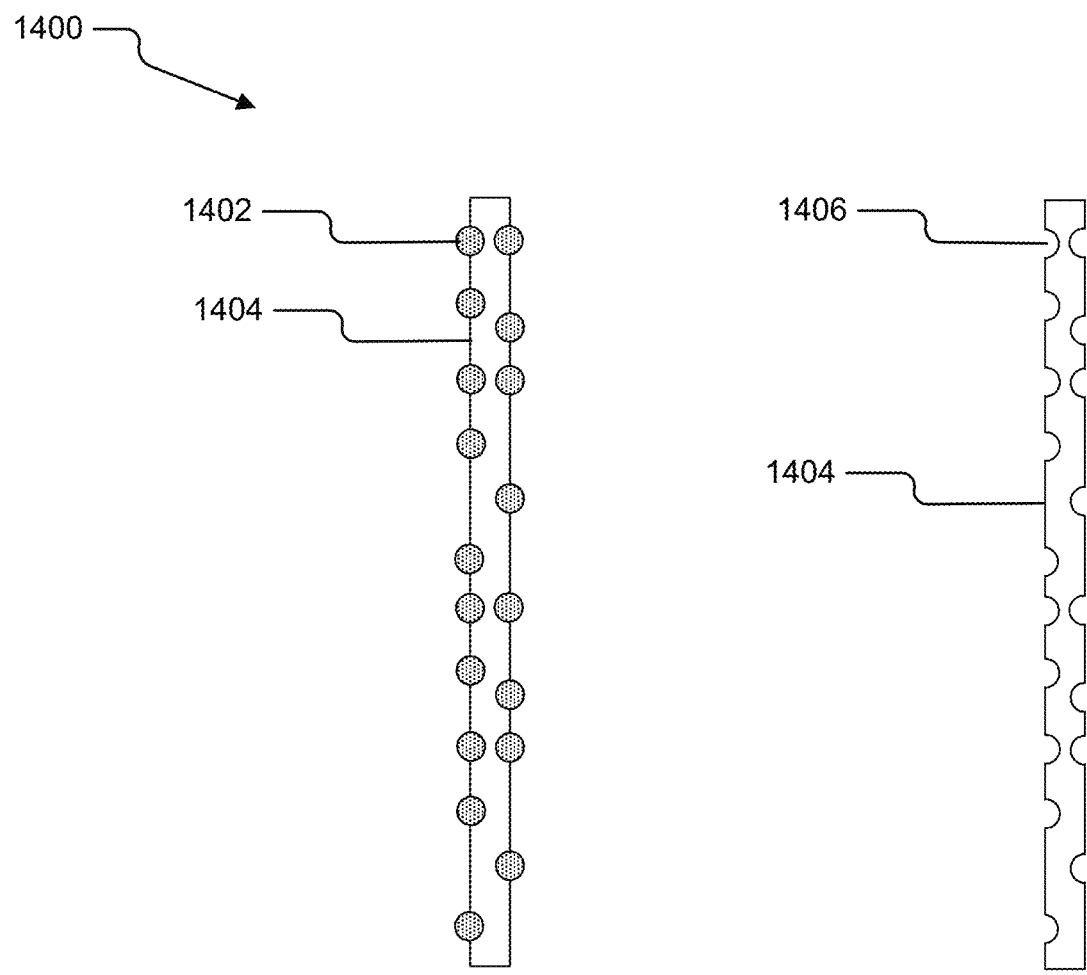
FIG. 11 shows an example approach for forming microstructures in a packing sheet using dissolvable solids.

FIG. 11 shows an example approach 1400 for forming microstructures 1406 in a packing sheet (or packing material) 1404 using dissolvable solids 1402 for a gas-liquid contactor system, such as gas-liquid contactor 100 shown in FIGS. 1A-1B. In some applications wherein microstructures 1406 are desired, a dissolvable solid 1402 may be introduced prior to installing the packing material 1404 into the $CO_2$ capture system. At a later stage, a conditioning step is taken, wherein the dissolvable solid 1402 is dissolved with a dissolving fluid (e.g., acid, caustic solution, $CO_2$ capture solution, etc.), changing the texture of packing material 1404 by leaving microstructures 1406 such as a dimple, ridge or perforations. The dissolvable solid 1402 can be added during the manufacturing and/or coating of the packing material 1404. For example, the dissolvable solid 1402 can be introduced into packing material 1404 comprising the PVC resin and/or vinyl compound. In some applications, the dissolvable solid 1402 is introduced as part of a coating onto the formed sheets of packing material 1404, rather than into a packing material feedstock 1404.

At a later stage, for example during conditioning of the packing or during start up process of the gas-liquid contactor including the packing, the dissolvable solid 1402 can dissolve with the dissolving fluid. The disappearance of dissolvable solid 1402 can change the texture of packing material 1404 by leaving behind microstructures 1406. Some examples of dissolvable solids 1402 that might be used for this feature are silica compounds, calcium carbonate ($CaCO_3$), or potassium carbonate ($K_2CO_3$) or an equivalent solid that can be dissolved in the dissolving fluid. For example, the dissolving fluid can be a chemical wash (e.g., acid) applied in a conditioning step, or a caustic capture solution. The chemical wash can involve dissolving the dissolvable solid 1402 with solutions such as dilute acetic acid, vinegar, NaCl, or the like. The conditioning step can involve dissolving the dissolvable solid 1402 with caustic capture solutions such as KOH or NaOH or the like. In some cases, the dissolving fluid can be water or steam that dissolves certain dissolvable solids 1402, such as salts or minerals that are soluble in water (e.g., calcium, sodium, chlorides, bicarbonates, sulfates, organic matter, etc.). In some cases, the dissolving fluid can be heated to increase dissolution rate of the dissolvable solids 1402.

Figure 12:
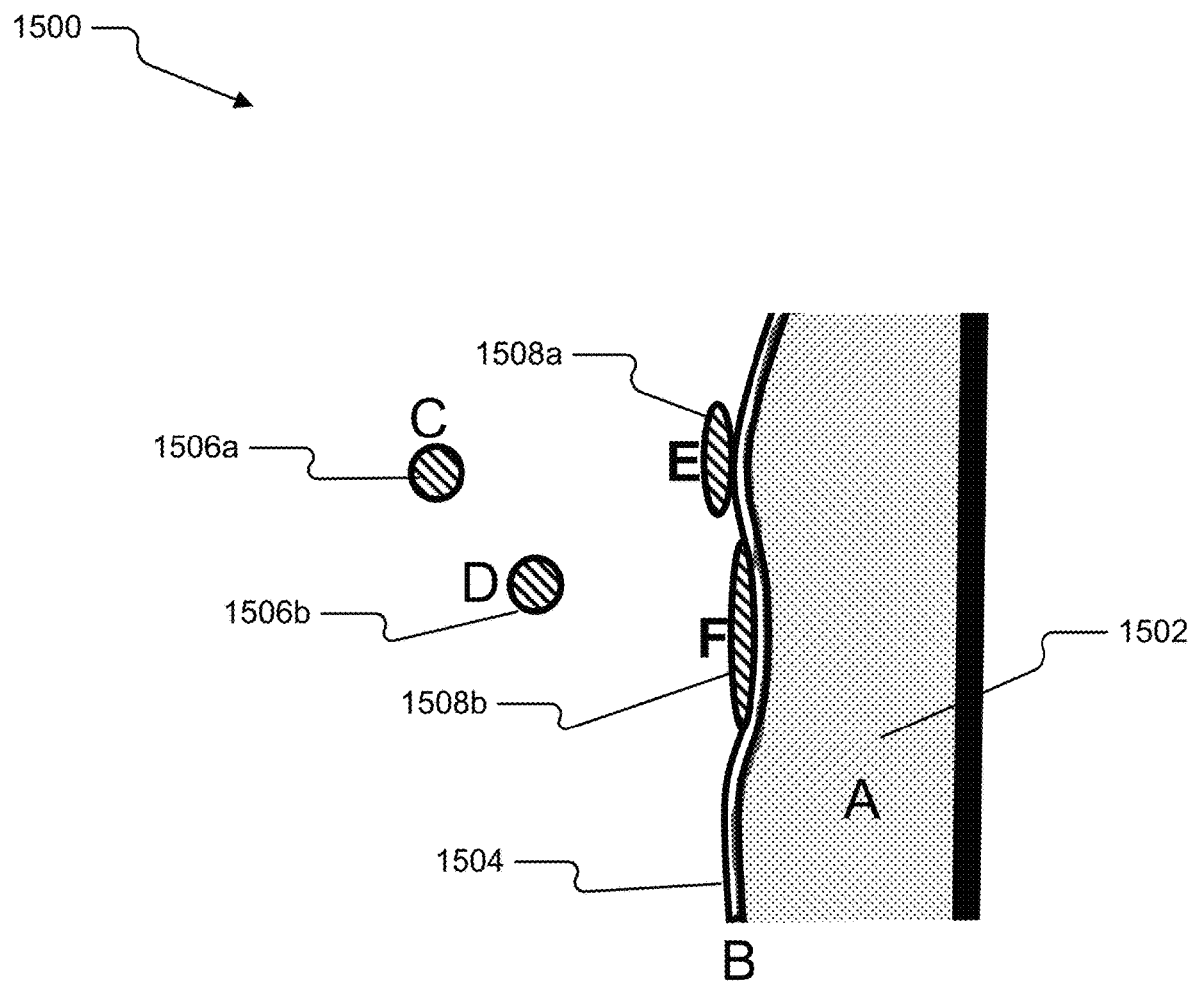
FIG. 12 shows an interaction of atomized solution with a liquid interface.

Along with increasing the surface energy (e.g., through coatings) and lowering the contact angle (e.g., through macrostructures and microstructures) of the packing, the $CO_2$ capture solution can be formulated and/or applied in a manner to increase hydrophilicity. For example, an atomized $CO_2$ capture solution feed that produces atomized spray droplets of $CO_2$ capture solution can be used to exploit the wetted surface area. FIG. 12 shows an interaction 1500 of atomized solution with a liquid interface layer 1504 for a gas-liquid contactor system, such as gas-liquid contactor 100 shown in FIGS. 1A-1B.

An atomized solution feed can be used in conjunction with any of the designs of the packing that improve wetted surface area (e.g., hydrophilic-coated packing, packing with macrostructures, packing with microstructures, or a combination thereof). In some aspects, atomized solution droplets 1506a, 1506b (collectively 1506) are small enough to be effectively transported by a gas in the direction of the gas flow. Normal cooling tower nozzle spray liquid distribution (non-atomized) is typically in bulk flow and larger droplets which get transported mostly via gravity.

The $CO_2$ capture solution can be distributed to the packing as an atomized spray, co-currently with gas flow, to improve performance. Surfaces require a minimum wetting flow or liquid flow (flow rate of the $CO_2$ capture solution) to achieve a certain amount of wetting. In some cases, at low liquid flows, atomized solutions droplets 1506 can enhance wetting (e.g., compared to non-atomized droplets) if a hydrophilic surface or surface with an optimal contact angle is used. In some cases, at high liquid flows, atomized solution droplets 1506 may not significantly enhance wetting (e.g., compared to non-atomized droplets) if a hydrophobic surface is used. High liquid flow can result in turbulence of the atomized solution droplets 1506, and the absorption of the atomized solution droplets 1506 to the bulk solution can be disrupted by the turbulence of the solution at the high wetting flow rates. If the packing is hydrophobic, atomized solution droplets 1506 can be less effective because the bulk solution layer 1502 is smaller due to beading.

If the packing is hydrophilic, atomized solution droplets 1506 can be more effective because the bulk solution layer 1502 is larger due to spread. The bulk solution layer 1502 is determined, in part, by the spray flow rate chosen, and not necessarily by the minimum wetting flow. If the specific surface area is increased due to hydrophilicity or by employing small-scale structures on the surface, the active liquid interfacial area can be continuously replenished by replenishing droplets 1508a, 1508b. Replenishing droplets 1508 are atomized solution droplets that replenish the liquid interface layer 1504 which can affect the reaction rate. On large scale systems, the liquid flow at the bottom of the packing may also get rather large. It may be necessary to selectively divert this flow at staged levels throughout the packing.

As another example of a modification to conventional $CO_2$ capture solution, the $CO_2$ capture solution can include one or more enzymatic compounds or catalysts that increase hydrophilicity, and/or increase the rate of transfer of gaseous $CO_2$ into solution. For example, it can be beneficial to implement a rate-enhancing additive in a gas-liquid contactor (e.g., the gas-liquid contactor 100 of FIGS. 1A-1B) that houses the packing. The rate-enhancing additive can increase the rate of transfer of $CO_2$ from the gas to the $CO_2$ capture solution. Rate-enhancing additives can include catalysts, promoters, solvents, or other types of additives. Examples of rate-enhancing additives can include, for example, carbonic anhydrase, piperazine, MEA, DEA, zinc triazacycles, zinc tetraazacycles, copper glycinates, hydroxopentaaminecobalt perchlorate, formaldehyde hydrate, saccharose, fructose, glucose, phenols, phenolates, glycerin, arsenite, hypochlorite, hypobromite, or other oxyanionic species.

In some cases, the rate-enhancing additive can move freely in the $CO_2$ capture solution that flows over the packing. In some cases, the rate-enhancing additive can be immobilized in capsules that move freely in the $CO_2$ capture solution that flows over the packing. In cases where the rate-enhancing additive is moving freely, the rate-enhancing additive can be detained within gas-liquid contactor and impeded from flowing to a regeneration system by a barrier or a filtration system.

In some cases, it can be advantageous to coat a surface of the packing with a rate-enhancing material that includes a rate-enhancing additive, for example a promoter or a catalyst, that is stabilized on a solid support by immobilization methods. For example, at least one of the microstructures, macrostructures, or smooth surface of a packing sheet can be coated with a rate-enhancing material.

In some cases, it can be advantageous to blend the raw packing material feedstocks used in manufacturing packing with a rate-enhancing additive. For example, a packing sheet may comprise a blend of PVC and resin that holds a promoter or catalyst. In this case, the promoter or catalyst may be stabilized on a solid support in the resin. In some applications, a freely moving rate-enhancing additive in the capture solution, a rate-enhancing material coated on surfaces, a rate-enhancing material blended within material of the packing, or a combination thereof can be employed to improve $CO_2$ uptake.

Figure 13:
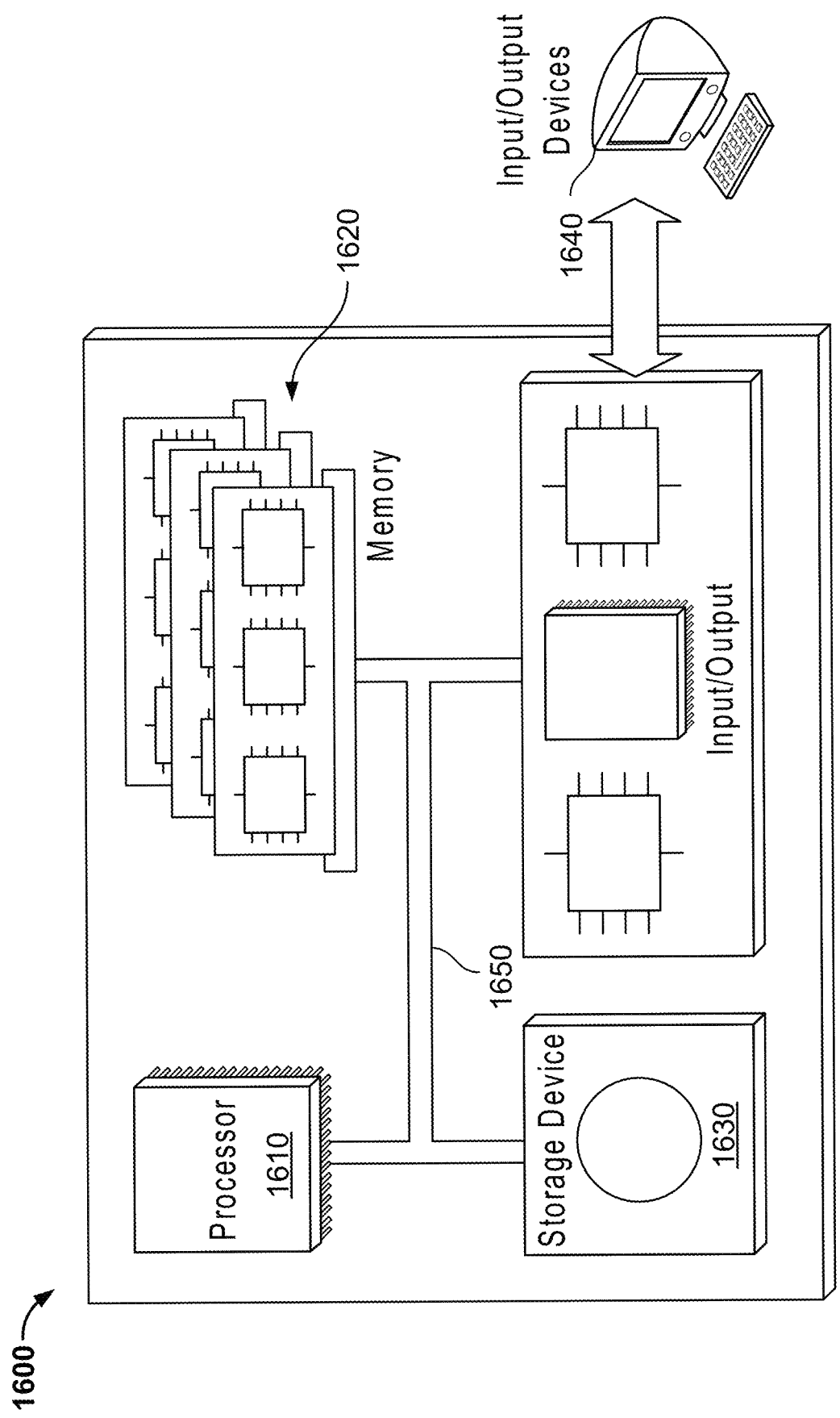
FIG. 13 is a schematic diagram of an example control system for a gas-liquid contactor system.

FIG. 13 is a schematic diagram of a control system (or controller) 1600 for a gas-liquid contactor system, such as gas-liquid contactor 100 shown in FIGS. 1A-1B. The system 1600 can be used for the operations described in association with any of the computer-implemented methods described previously, for example as or as part of the control system 999 or other controllers described herein.

The system 1600 is intended to include various forms of digital computers, such as laptops, desktops, workstations, personal digital assistants, servers, blade servers, mainframes, and other appropriate computers. The system 1600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 1600 includes a processor 1610, a memory 1620, a storage device 1630, and an input/output device 1640. Each of the components 1610, 1620, 1630, and 1640 are interconnected using a system bus 1650. The processor 1610 is capable of processing instructions for execution within the system 1600. The processor may be designed using any of a number of architectures. For example, the processor 1610 may be a CISC (Complex Instruction Set Computers) processor, a RISC (Reduced Instruction Set Computer) processor, or a MISC (Minimal Instruction Set Computer) processor.

In one implementation, the processor 1610 is a single-threaded processor. In some implementations, the processor 1610 is a multi-threaded processor. The processor 1610 is capable of processing instructions stored in the memory 1620 or on the storage device 1630 to display graphical information for a user interface on the input/output device 1640.

The memory 1620 stores information within the system 1600. In one implementation, the memory 1620 is a computer-readable medium. In one implementation, the memory 1620 is a volatile memory unit. In some implementations, the memory 1620 is a non-volatile memory unit.

The storage device 1630 is capable of providing mass storage for the system 1600. In one implementation, the storage device 1630 is a computer-readable medium. In various different implementations, the storage device 1630 may be a floppy disk device, a hard disk device, an optical disk device, or a tape device.

The input/output device 1640 provides input/output operations for the system 1600. In one implementation, the input/output device 1640 includes a keyboard and/or pointing device. In some implementations, the input/output device 1640 includes a display unit for displaying graphical user interfaces.

Certain features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

A number of embodiments of the disclosure have been described. Nevertheless, it will be understood that various modifications may be made without departing from the spirit and scope of the disclosure. Accordingly, other embodiments are within the scope of the following claims. Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description. Changes may be made in the elements described herein without departing from the spirit and scope as described in the following claims.

What is claimed is:

1. A system for removing $CO_2$ from a dilute gas mixture, the system comprising:
    a frame comprising a plurality of structural members;
    at least one packing section comprising one or more packing sheets, the one or more packing sheets comprising a plurality of macrostructures;
    one or more bottom basins positioned at least partially below the at least one packing section relative to a flow of a $CO_2$ capture solution along the at least one packing section, the one or more bottom basins configured to hold the $CO_2$ capture solution;
    at least one fan positioned to circulate a $CO_2$-laden gas through the at least one packing section; and
    a liquid distribution system comprising one or more top basins for the $CO_2$ capture solution, the one or more top basins for the $CO_2$ capture solution configured to direct the $CO_2$ capture solution to the at least one packing section at a liquid loading rate in a range from 0.5 $L/m^2s$ to 5.0 $L/m^2s$, the liquid distribution system comprising one or more redistribution systems positioned above the one or more bottom basins and within the at least one packing section.

2. The system of claim 1, wherein the at least one packing section and fan are configured to flow the $CO_2$-laden gas through the at least one packing section in a crossflow configuration relative to the $CO_2$ capture solution.

3. The system of claim 1, wherein the at least one packing section and fan are configured to flow the $CO_2$-laden gas through the at least one packing section in a counterflow configuration relative to the $CO_2$ capture.

4. The system of claim 1, wherein:
    the one or more-top basins are positioned at least partially above the at least one packing section relative to the flow of the $CO_2$ capture solution along the at least one packing section; and
    the liquid distribution system comprises the one or more redistribution systems positioned below the one or more-top basins.

5. The system of claim 1, wherein the one or more packing sheets comprise a first set of gradual channels at a first angle and a second set of gradual channels at a second angle that is greater than the first angle.

6. The system of claim 5, wherein the first angle is 15 degrees and the second angle is 45 degrees or less.

7. The system of claim 1, wherein the one or more packing sheets comprises a hydrophilic surface coating.

8. The system of claim 1, wherein the one or more packing sheets comprises a hydrophilic surface treatment.

9. The system of claim 1, wherein the plurality of macrostructures comprises at least one of: corrugations, flutes, herringbone, or channels.

10. The system of claim 9, wherein the one or more packing sheets further comprises a plurality of microstructures.

11. The system of claim 10, wherein the plurality of microstructures comprises a plurality of ridges that are nonparallel to the corrugations.

12. The system of claim 10, wherein the corrugations are aligned with a direction of the flow of the $CO_2$ capture solution from the one or more top basins onto the at least one packing section.

13. The system of claim 11, wherein the plurality of microstructures comprises at least one of ridges, dimples, pores, etches, granules, fibres, perforations, or a combination thereof.

14. The system of claim 13, wherein the ridges comprise a plurality of cross-stream ridges.

15. The system of claim 7, wherein the hydrophilic surface coating comprises a cellulose layer and at least one of an EVA layer or a PVC glue layer.

16. The system of claim 7, wherein the hydrophilic surface coating comprises at least one acrylic coating.

17. The system of claim 16, wherein the at least one acrylic coating comprises at least one of a urethane-acrylic hybrid copolymer or a self-crosslinking acrylic copolymer emulsion.

18. The system of claim 17, wherein the at least one acrylic coating comprises:
    a first acrylic layer that comprises the urethane-acrylic hybrid copolymer or the self-crosslinking acrylic copolymer emulsion; and
    a second acrylic layer that comprises the urethane-acrylic hybrid copolymer blended with the self-crosslinking acrylic copolymer emulsion.

19. The system of claim 1, wherein the one or more packing sheets comprises a hydrophilic material composition.

20. The system of claim 19, wherein the hydrophilic material composition comprises a PVC resin or vinyl compound.

21. The system of claim 1, wherein the $CO_2$ capture solution comprises a low surface tension $CO_2$ capture solution.

22. The system of claim 1, wherein the one or more packing sheets comprises at least one of: a rate-enhancing additive or a rate-enhancing coating.

23. The system of claim 1, wherein the one or more packing sheets comprises a plurality of dissolvable solids.

24. The system of claim 1, wherein the $CO_2$ capture solution comprises a caustic capture solution.

25. The system of claim 1, wherein the liquid distribution system is configured to flow the $CO_2$ capture solution from the one or more bottom basins onto the at least one packing section.

26. The system of claim 1, wherein the one or more redistribution systems comprises one or more liquid basins.

* * * * *